United States Patent [19]

Kanno et al.

[11] Patent Number: 5,351,228
[45] Date of Patent: Sep. 27, 1994

[54] OPTICAL DISK DRIVE UNIT

[75] Inventors: Tetsuo Kanno, Ebina; Akihiko Okamoto, Yokohama, both of Japan

[73] Assignee: Ricoh Company Ltd., Tokyo, Japan

[21] Appl. No.: 921,300

[22] Filed: Jul. 28, 1992

Related U.S. Application Data

[63] Continuation-in-part of Ser. No. 747,529, Aug. 20, 1991, abandoned.

[30] Foreign Application Priority Data

| Sep. 20, 1990 | [JP] | Japan | 2-248913 |
| Apr. 18, 1991 | [JP] | Japan | 3-086732 |
| Aug. 20, 1991 | [JP] | Japan | 3-231151 |

[51] Int. Cl.$^5$ ............................. G11B 17/04
[52] U.S. Cl. .................... 369/77.2; 360/99.08; 360/133
[58] Field of Search .......... 369/77.1, 77.2, 263, 369/264; 360/86, 97.01, 99.02, 99.06, 133

[56] References Cited

U.S. PATENT DOCUMENTS

| 4,339,777 | 6/1982 | Gruczelak | 360/97 |
| 4,389,717 | 6/1983 | Camerik | 369/75 |
| 4,408,321 | 10/1983 | Yamamura | 369/77.2 |
| 4,454,599 | 6/1984 | Tsuchiya | 369/77.2 |
| 4,489,356 | 12/1984 | Farmer | 360/97 |
| 4,509,158 | 9/1985 | Kang | 369/77.2 |
| 4,573,092 | 2/1986 | Sugiyama et al. | 369/77.2 |
| 4,581,668 | 4/1986 | Campbell | 360/97 |
| 4,642,715 | 2/1987 | Ende | 360/71 |
| 4,675,858 | 6/1987 | d'Alayer de Costemore d'Arc | 369/77.1 |
| 4,691,257 | 9/1987 | Taguchi | 369/77.2 |
| 4,692,827 | 9/1987 | Biermeier et al. | 360/97 |

(List continued on next page.)

FOREIGN PATENT DOCUMENTS

| 0134419 | 3/1985 | European Pat. Off. |
| 60-202591 | 10/1985 | Japan |
| 61-142589 | 6/1986 | Japan |
| 62-295291 | 12/1987 | Japan |
| 63-293783 | 11/1988 | Japan |
| 648546 | 1/1989 | Japan |
| 1185840 | 7/1989 | Japan |
| 0220172 | 9/1989 | Japan |
| 0089249 | 3/1990 | Japan |
| 0134761 | 5/1990 | Japan |
| 0027757 | 6/1990 | Japan |
| 2239494 | 9/1990 | Japan |

OTHER PUBLICATIONS

D. S. Gaunt and G. J. Hillary, "Cooling Electrical Equipment", Proceedings of IBM Technical Disclosure Bulletin, vol. 20 No. 6 Nov. 1977, pp. 2428–2429.

*Primary Examiner*—Paul M. Dzierzynski
*Assistant Examiner*—Kiet T. Nguyen
*Attorney, Agent, or Firm*—Cooper & Dunham

[57] ABSTRACT

An optical disk drive unit has an opening portion formed in a body case to insert an optical disk cartridge having an optical disk therein into the body case and take the optical disk cartridge out of the body case; a driving device for receiving and rotating the optical disk; and a rotatable shutter for opening and closing the opening portion. A leg portion extends from a shutter body. A center of rotation of the leg portion is located on a side of the driving device disposed within the body case and away from the opening portion of the body case. No closing operation of the shutter body is influenced by mounting the optical disk cartridge into the body case. At least one face of the shutter may be constructed by an arc face having a shape approximately equal to the shape of an arc around the center of rotation. A projecting portion may be disposed outside the shutter. In this case, a lower portion of the projecting portion comes in contact with the optical disk cartridge after an end portion of the projecting portion comes in contact with the optical disk cartridge.

21 Claims, 21 Drawing Sheets

U.S. PATENT DOCUMENTS

| | | | |
|---|---|---|---|
| 4,723,185 | 2/1988 | Maeda | 360/97 |
| 4,725,904 | 2/1988 | Dassiel | 360/97 |
| 4,727,444 | 2/1988 | Fukushima et al. | 360/97 |
| 4,736,356 | 4/1988 | Konshak | 369/75.1 |
| 4,771,412 | 9/1988 | Aihara et al. | 369/75.1 |
| 4,780,776 | 10/1988 | Dushkes | 360/97.03 |
| 4,785,365 | 11/1988 | Ohkita | 360/97 |
| 4,815,065 | 3/1989 | Rouws | 369/77.2 |
| 4,816,945 | 3/1989 | Watanabe | 360/99.07 |
| 4,829,393 | 5/1989 | Shimizu et al. | 360/99.07 |
| 4,829,504 | 5/1989 | Sunaga et al. | 369/75.2 |
| 4,847,711 | 6/1989 | Inoue | 369/72 |
| 4,866,693 | 6/1989 | Odawara et al. | 369/75.2 |
| 4,878,138 | 10/1989 | Ando et al. | 360/99.02 |
| 4,882,722 | 11/1989 | Matsuura et al. | 369/75.2 |
| 5,060,101 | 10/1991 | Isomura | 360/99.06 |
| 5,086,422 | 2/1992 | Hagiya et al. | 369/75.1 |
| 5,172,362 | 12/1992 | Hattori et al. | 369/77.2 |
| 5,231,623 | 7/1993 | Kanno et al. | 369/75.2 |

1

OPTICAL DISK DRIVE UNIT

CROSS-REFERENCE TO RELATED APPLICATIONS

This application is a continuation-in-part of application Ser. No. 747,529 filed Aug. 20, 1991, now abandoned.

BACKGROUND OF THE INVENTION

1. Field of the Invention

The present invention relates to an optical disk drive unit for driving an optical disk. More particularly, the present invention relates to a dustproof mechanism disposed in the optical disk drive unit.

2. Description of the Related Art

In a general optical disk drive unit, an optical disk cartridge is completely mounted onto a drive means for rotating an optical disk such that a rear end portion of the optical disk cartridge is arranged in the vicinity of an opening portion within a body case. However, there is a case in which a shutter plate is caught by a rear portion of the optical disk cartridge so that no opening portion can be completely closed.

In such a state, dust enters the body case from the exterior thereof through a clearance between the opening portion and the shutter plate. Therefore, there is a case in which the optical disk drive unit is broken or incorrectly operated by this dust.

SUMMARY OF THE INVENTION

It is therefore an object of the present invention to provide an optical disk drive unit for smoothly and reliably inserting and discharging an optical disk cartridge and reliably preventing dust from entering a body case through an opening portion by a simplified structure when the optical disk cartridge is completely mounted to a driving means.

In accordance with a first structure of the present invention, the above object can be achieved by an optical disk drive unit comprising an opening portion formed in a body case to insert an optical disk cartridge having an optical disk therein into the body case and take the optical disk cartridge out of the body case; driving means for receiving and rotating the optical disk; and a rotatable shutter for opening and closing the opening portion and formed such that a center of rotation of the shutter is located on a side of the driving means within the body case.

In accordance with a second structure of the present invention, at least one face of the shutter may be constructed by an arc face having a shape approximately equal to the shape of an arc around the center of rotation in the first structure.

In accordance with a third structure of the present invention, a projecting portion may be disposed outside the shutter in the first structure. In this case, a lower portion of the projecting portion comes in contact with the optical disk cartridge after an end portion of the projecting portion comes in contact with the optical disk cartridge.

In accordance with a fourth structure of the present invention, at least one roller may be rotatably disposed in the shutter and comes in contact with the optical disk cartridge in the first structure.

In accordance with a fifth structure of the present invention, the optical disk drive unit may further comprise a cam for opening the shutter in association with an operation for ejecting the optical disk cartridge from the body case in the first structure.

In accordance with a sixth structure of the present invention, a portion of the cam and the optical disk cartridge in the fifth structure come in contact with each other and are associated with each other and a roller is disposed in a cam portion coming in contact with the optical disk cartridge.

In accordance with a seventh structure of the present invention, the optical disk drive unit having the fifth or sixth structure further comprises a spring for biasing the shutter in an opening direction thereof during an opening operation of the shutter using the cam.

In accordance with an eighth structure of the present invention, the optical disk drive unit having the fifth or sixth structure further comprises a rotating cam for rotating the shutter in an opening direction thereof during an opening operation of the shutter using the cam.

In accordance with a ninth structure of the present invention, the shutter in the first structure is constructed by a first door and a second door coming in contact with this first door, and a center of rotation of the first door is arranged on the side of the driving means and a center of rotation of the second door is arranged on a side opposite to a side of the second door coming in contact with the first door.

In accordance with a tenth structure of the present invention, the center of rotation of the second door is arranged near the opening portion of the body case in comparison with the center of rotation of the first door in the ninth structure.

In accordance with an eleventh structure of the present invention, a radius of rotation of the second door is set to be smaller than that of the first door in the ninth structure.

In accordance with a twelfth structure of the present invention, the shutter in the first structure is constructed by a first door and a second door having a center or rotation in the first door and opened in only a discharging direction of the optical disk cartridge.

In accordance with a thirteenth structure of the present invention, the optical disk drive unit having the first structure further comprises an engaging portion detachably engaged with a notch portion disposed in the optical disk cartridge to temporarily stop a discharging operation of the optical disk cartridge.

In accordance with a fourteenth structure of the present invention, an angle formed between an inserting direction of the optical disk cartridge and a face of the engaging portion on an inserting side of the optical disk cartridge in the thirteenth structure is set to be smaller than an angle formed between the inserting direction of the optical disk cartridge and a face of the engaging portion on a side opposite to the inserting side of the optical disk cartridge.

In accordance with a fifteenth structure of the present invention, the optical disk drive unit having the first structure further comprises an engaging portion detachably engaged with a notch portion disposed in the optical disk cartridge to temporarily stop a discharging operation of the optical disk cartridge, and this engaging portion is partially disposed in the vicinity of the opening portion of the body case.

In accordance with a sixteenth structure of the present invention, the optical disk drive unit having the first structure further comprises a contact portion disposed in the shutter and coming in contact with the optical disk cartridge to stop a movement of the shutter when the optical disk cartridge is mounted to the driving means.

In accordance with a seventeenth structure of the present invention, the optical disk drive unit having the first structure further comprises a display body indicating a mounting state of the optical disk cartridge and moved to a display window portion in association with a movement of the optical disk cartridge mounted to the driving means.

In accordance with an eighteenth structure of the present invention, the display body in the seventeenth structure has characters showing the mounting state of the optical disk cartridge, or has a color different from that of a peripheral member.

In accordance with a nineteenth structure of the present invention, the optical disk drive unit having the first structure further comprises an operating body disposed inside the shutter and engaged with a loading mechanism of the optical disk cartridge to move the loading mechanism such that the optical disk cartridge can be discharged from the optical disk drive unit.

In accordance with a twentieth structure of the present invention, the optical disk drive unit having the first structure further comprises a switch engaged with a portion of the shutter and stopping an operation of the driving means when the shutter is opened.

In accordance with a twenty-first structure of the present invention, a discharging operation of the optical disk cartridge is performed when the shutter is opened in the twentieth structure.

In the above first structure, the center of rotation of the shutter is located on the side of the driving means away from the opening portion. Accordingly, it is possible to arrange the shutter in a position in which no closing operation of the the shutter for closing the opening portion is prevented by the optical disk cartridge when the optical disk cartridge is completely mounted into the body case. Therefore, it is possible to reliably prevent dust from entering the body case through the opening portion when the optical disk cartridge is completely mounted to the driving means.

In the second structure, a shutter face is constructed by an arc face having a shape approximately equal to the shape of an arc around the center of rotation of the shutter. Accordingly, it is possible to reduce a space required to operate the shutter so that a space for arranging the optical disk drive unit is reduced.

In the third structure, when the shutter is pushed upward by the optical disk cartridge, the lower portion of the projecting portion comes in contact with a portion of the optical disk cartridge after the front end portion of the projecting portion comes in contact with the portion of the optical disk cartridge. Then, this portion of the optical disk cartridge is pressed against the lower portion of the projecting portion so that the shutter is smoothly rotated upward.

In the fourth structure, when the shutter is moved by the optical disk cartridge, the roller of the shutter comes in contact with the optical disk cartridge. Accordingly, contact resistance between the shutter and the optical disk cartridge is reduced so that the shutter is smoothly opened and closed.

In the fifth structure, when the optical disk cartridge is ejected from the body case, the shutter is opened by the cam operated in association with the ejecting operation of the optical disk cartridge. Accordingly, at this time, no optical disk cartridge comes in contact with an inside portion of the shutter so that durability of the optical disk drive unit is improved.

In the sixth structure, contact resistance is reduced by the roller disposed in the contact portion of the cam coming in contact with the optical disk cartridge. Accordingly, no optical disk cartridge is damaged and inserting and discharging operations of the optical disk cartridge are preferably performed.

In the seventh and eighth structures, the shutter is opened by the above spring or the rotating cam such that no cam comes in contact with the optical disk cartridge when the optical disk cartridge is discharged. Accordingly, a discharging load is reduced at the discharging time of the optical disk cartridge and the discharging operation of the optical disk cartridge is smoothly performed.

In the ninth structure, the second door is rotated in a position in which no manual inserting operation is prevented by rotation of the second door when the optical disk cartridge is inserted. Accordingly, it is possible to prevent dust from entering the optical disk drive unit and the optical disk cartridge is easily inserted into the optical disk drive unit.

In the tenth structure, when the optical disk cartridge is mounted into the body case, the second door is first closed before a closing operation of the first door. Accordingly, it is possible to reliably prevent dust from entering the optical disk drive unit.

In the eleventh structure, a space required to rotate the doors can be minimized.

In the twelfth structure, the compact second door is opened when the optical disk cartridge is discharged. Accordingly, at the discharging time of the optical disk cartridge, a discharging load is reduced and the discharging operation of the optical disk cartridge is smoothly performed.

In the thirteenth structure, the discharging operation of the optical disk cartridge can be temporarily stopped by the engaging portion when the optical disk cartridge is discharged. Accordingly, a discharging amount of the optical disk cartridge can be constantly stabilized.

In the fourteenth structure, angles formed between engaging faces of the above engaging portion and the inserting direction of the optical disk cartridge are different from each other. Accordingly, no insertion of the optical disk cartridge is prevented by the engaging portion when the optical disk cartridge is inserted. When the optical disk cartridge is discharged, it is possible to reliably stop a discharging movement of the optical disk cartridge once.

In the fifteenth structure, the engaging portion is disposed in an arbitrary position in the vicinity of the opening portion of the body case. Accordingly, it is easy to control a discharging amount of the optical disk cartridge.

In the sixteenth structure, when the optical disk cartridge is mounted to the body case, no shutter can be moved since the contact portion comes in contact with the optical disk cartridge. Accordingly, no second optical disk cartridge can be inserted so that there is no fear that this optical disk cartridge is inserted in error.

In the seventeenth and eighteenth structures, when the optical disk cartridge is mounted to the body case, the mounting state of the optical disk cartridge can be externally displayed by the display body through the display window portion using a color or characters without using any electric means such as LED. Accordingly, a mechanism for preventing the optical disk cartridge from being inserted in error can be provided by a structure cheaply manufactured.

In the nineteenth structure, the operating body is disposed inside the shutter and constitutes an emergent ejecting mechanism for ejecting the optical disk cartridge in emergency such as stoppage of electric power. Accordingly, it is possible to more reliably prevent dust from entering the optical disk drive unit.

In the twentieth and twenty-first structures, when the shutter is opened, the above switch detects an opening state of the shutter to stop an operation of the driving means or discharge the optical disk cartridge. Accordingly, the optical disk drive unit is safely operated. For example, when the shutter is opened in error at a supplying time of electric power, an accident can be prevented and warning is given to a user by the discharging operation of the optical disk cartridge.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of an optical disk drive unit in the present invention will next be described in detail with reference to the accompanying drawings.

Figure 1:
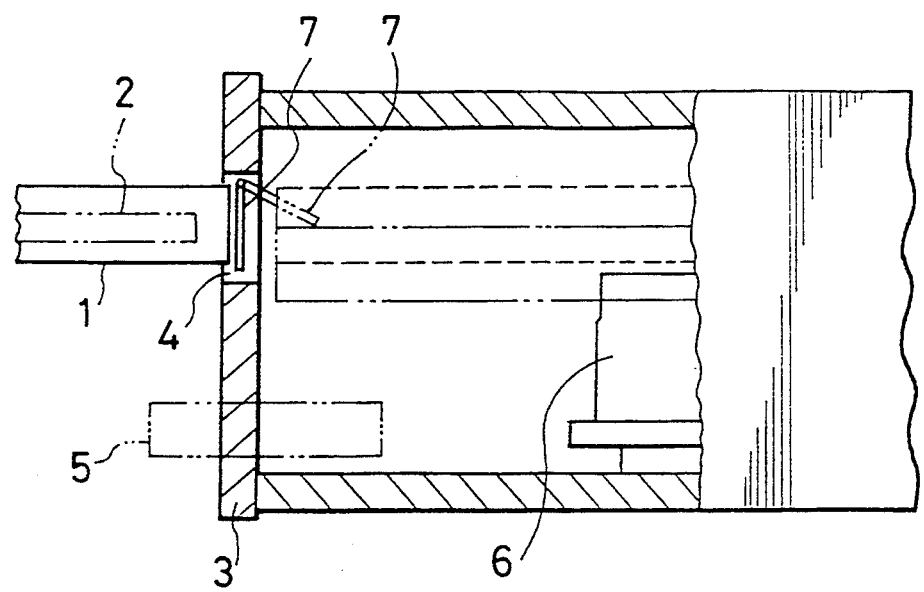
FIG. 1 is an explanatory view showing one example of a general optical disk drive unit.

FIG. 1 is an explanatory view showing one example of a general optical disk drive unit. In FIG. 1, an optical disk cartridge 1 has an optical disk 2 therein. An opening portion 4 is formed on one side of a body case 3 to insert the optical disk cartridge 1 into the body case 3 and take this optical disk cartridge 1 out of the body case 3. A well-known ejecting button 5 is slidably attached to the body case 3 under the opening portion 4. A driving means 6 is arranged within the body case 3 and is constructed by a rotary motor, etc. for receiving the optical disk 2 thereon and rotating this optical disk 2. A shutter plate 7 is pivotally supported by the opening portion 4 in an upper end portion thereof.

In FIG. 1, the optical disk cartridge 1 is inserted into the body case 3 while the shutter plate 7 rotatably attached to the opening portion 4 is pressed by an end portion of the optical disk cartridge 1. When the optical disk cartridge 1 is inserted into the body case 3 until a complete inserting position shown by a broken line in FIG. 1, the optical disk cartridge 1 is mounted onto the driving means 6 by an unillustrated loading means in a position shown by a two-dotted chain line. Thereafter, information is recorded onto the optical disk 2 and is reproduced therefrom by rotating the optical disk 2 by the driving means 6.

The optical disk cartridge 1 is externally ejected from the body case 3 by pushing the ejecting button 5 inside the body case 3 so that it is possible to take the optical disk cartridge 1 out of the body case 3.

In the above general optical disk drive unit, the optical disk cartridge 1 is completely mounted onto the drive means 6 such that a rear end portion of the optical disk cartridge 1 is arranged in the vicinity of the opening portion 4 within the body case 3. However, there is a case in which the shutter plate 7 is caught by a rear portion of the optical disk cartridge 1 so that no opening portion 4 can be completely closed as shown by a two-dotted chain line of the shutter plate 7 in FIG. 1.

In such a state, dust enters the body case 3 from the exterior thereof through a clearance between the opening portion 4 and the shutter plate 7. Therefore, there is a case in which the optical disk drive unit is broken or incorrectly operated by this dust.

Figure 2:
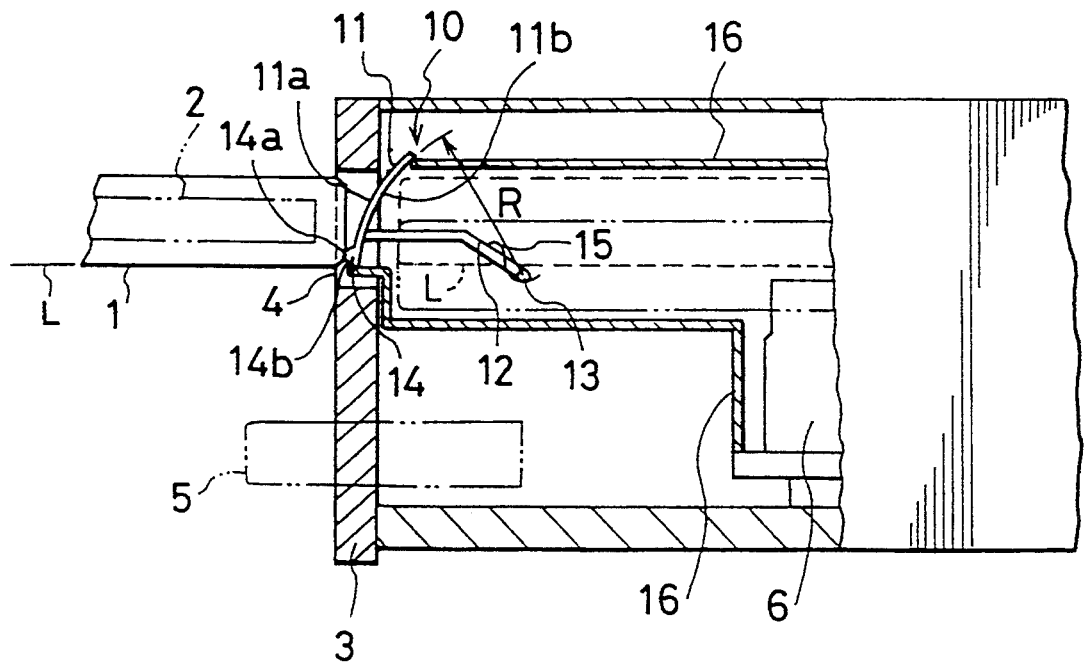
FIG. 2 is an explanatory view showing the construction of an optical disk drive unit in accordance with a first embodiment of the present invention.
Figure 3:
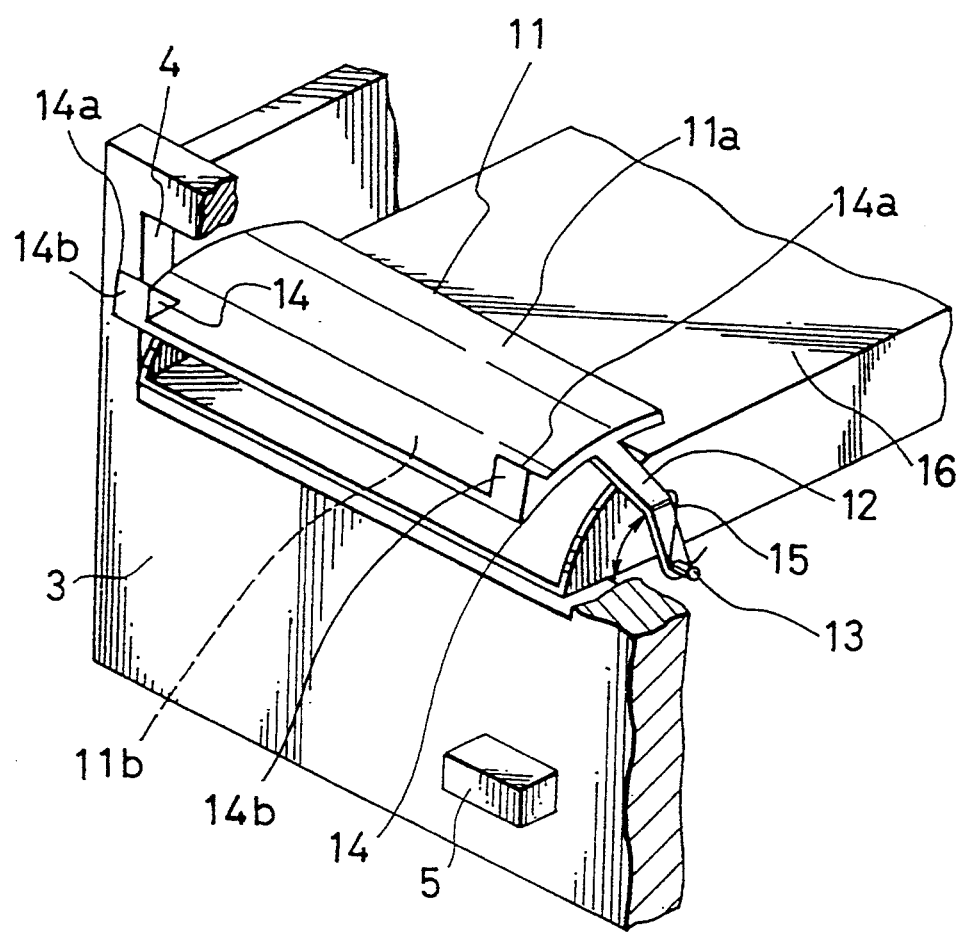
FIG. 3 is a perspective view of a main portion of the optical disk drive unit in the first embodiment of the present invention.

FIG. 2 is an explanatory view showing the construction of an optical disk drive unit in accordance with a first embodiment of the present invention. FIG. 3 is a perspective view of a main portion of the optical disk drive unit in the first embodiment of the present invention. In FIGS. 2 and 3, constructional portions corresponding to those shown in FIG. 1 are designated by the same reference numerals and a detailed explanation thereof is therefore omitted in the following description.

The optical disk drive unit in the first embodiment is different from the optical disk drive unit shown in FIG. 1 with respect to the structure of a shutter 10. The shutter 10 is composed of a shutter body 11 and a leg portion 12. The shutter body 11 is formed in the shape of an arc seen from a side of the shutter 10. The leg portion 12 extends inside a body case 3 from the shutter body 11. A center 13 of rotation of the shutter 10 is located below an extension line L on a lower face of an optical disk cartridge 1 when the optical disk cartridge 1 is inserted into the body case 3. Namely, the center 13 of rotation of the shutter 10 is located on the side of a driving means 6 below the extension line L. An end portion of the leg portion 12 is rotatably supported by the body case 3 at the center 13 of rotation of the shutter 10. Outer and inner arc faces 11a and 11b of the shutter body 11 are formed in a shape approximately equal to the shape of an arc of a radius R around the above center 13 of rotation. A projecting portion 14 is formed on the outer arc face 11a such that the disk cartridge 1 comes in contact with an end portion 14a of the projecting portion 14 and then comes in contact with a lower portion 14b of the projecting portion 14. A biasing spring 15 is attached to the leg portion 12 to bias the shutter body 11 in a direction in which an opening portion 4 is closed. A dustproof case 16 is disposed within the body case 3.

Figure 4A:
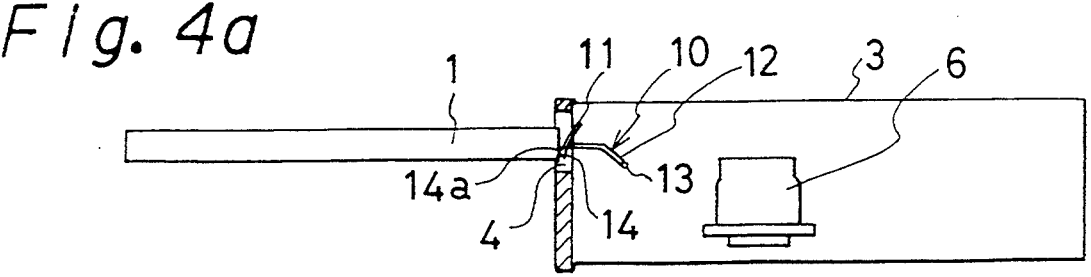
FIGS. 4a to 4f are views for explaining an operation of the optical disk drive unit in the first embodiment of the present invention.
Figure 4B:
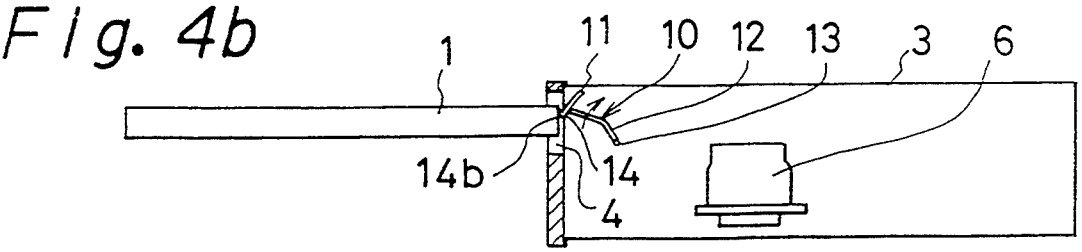
Figure 4C:
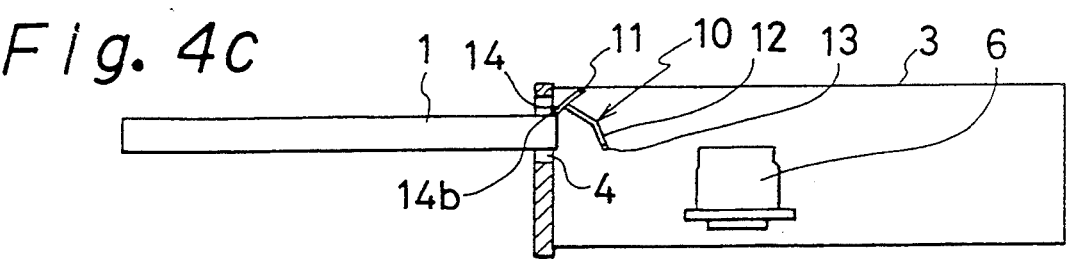
Figure 4D:
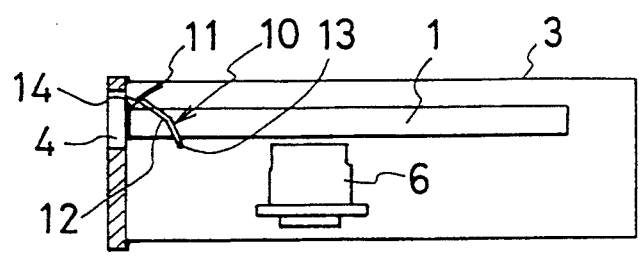
Figure 4E:
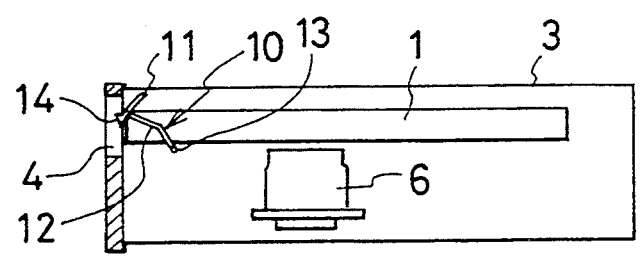

An operation of the optical disk drive unit in the first embodiment of the present invention will next be described with reference to FIGS. 4a to 4f. As shown in FIG. 4a, when the optical disk cartridge 1 is inserted into the body case 3 from the opening portion 4, a front end portion of the optical disk cartridge 1 first comes in contact with the end portion 14a of the projecting portion 14 of the shutter body 11. When the optical disk cartridge 1 is further inserted into the body case 3, the shutter 10 is rotated around the center 13 of rotation in the clockwise direction. Thus, as shown in FIG. 4b, the lower portion 14b of the projecting portion 14 is raised along a front end face of the optical disk cartridge 1. When the lower portion 14b of the projecting portion 14 reaches an upper side face of the optical disk cartridge 1 as shown in FIG. 4c, the optical disk cartridge 1 is inserted into the interior of the body case 3. When the projecting portion 14 reaches a rear end portion of the optical disk cartridge 1 as shown in FIG. 4d, biasing force of the biasing spring 15 shown in FIG. 2 is applied to the shutter 10. Accordingly, the shutter 10 is rotated around the center 13 of rotation in the counterclockwise direction as shown in FIG. 4e. Thus, the opening portion 4 is closed as shown in FIG. 4f.

Figure 4F:
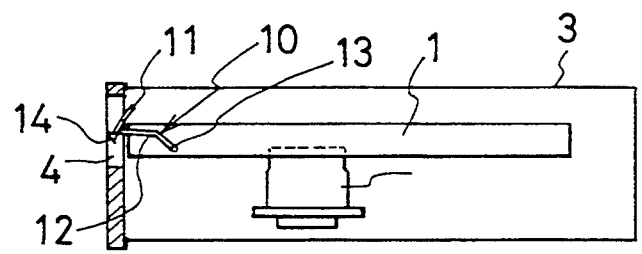

In the closing state of the opening portion 4 shown in FIG. 4f, the shutter 10 is reliably closed even when a complete mounting position of the optical disk cartridge I for completely mounting the optical disk cartridge 1 onto the driving means 6 is set in the vicinity of the opening portion 4 as shown by a two-dotted chain line in FIG. 2. The dustproof case 16 partially extending until the opening portion 4 comes in contact with a lower end of the shutter body 11 so that a space formed by the dustproof case 16 is closed. Therefore, it is possible to prevent dust, etc. from entering the dustproof case 16 from the exterior thereof.

Further, the shutter body 11 is formed in the shape of an arc, and air for cooling a driving portion can flow easily into the body case 3 on and along the outer arc face 11a, so that it is unnecessary to dispose a hole for cooling on the body case 3 above the opening portion 4 as usual and it is convenient on design.

Figure 5:
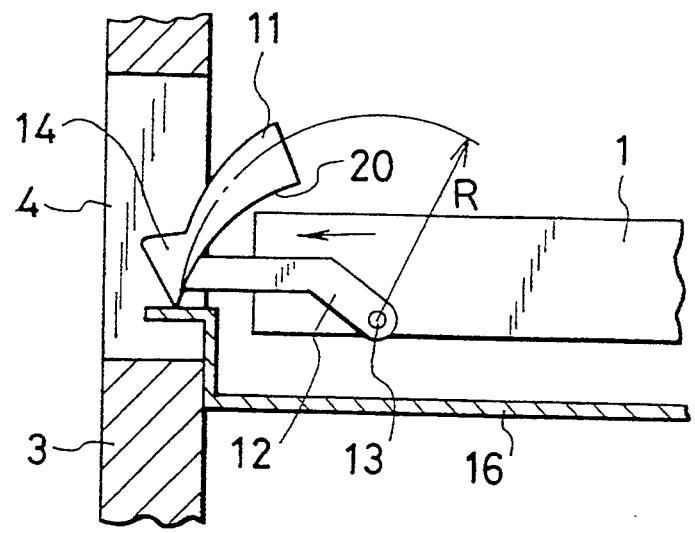
FIG. 5 is an explanatory view showing a modified example of a shutter disposed in the optical disk drive unit in the first embodiment of the present invention.

When the optical disk cartridge 1 is ejected from the body case 3, an operator pushes an ejecting button 5 and the shutter 10 is opened by operating a shutter opening/closing means in association with the operation of an unillustrated loading means. Thereafter, the optical disk cartridge 1 is ejected from the opening portion 4. As shown in FIG. 5, an inner face of the shutter body 11 can be inclined inwards with respect to the radius R of an arc around the center 13 of rotation so as to form a slanting face 20. In this case, the rear end portion of the optical disk cartridge 1 comes in contact with the slanting face 20 by applying ejecting force to the optical disk cartridge 1 and transversally moving the optical disk cartridge 1. Thus, the shutter 10 can be pushed and automatically opened by rotational force provided by a component of the ejecting force.

Figure 6:
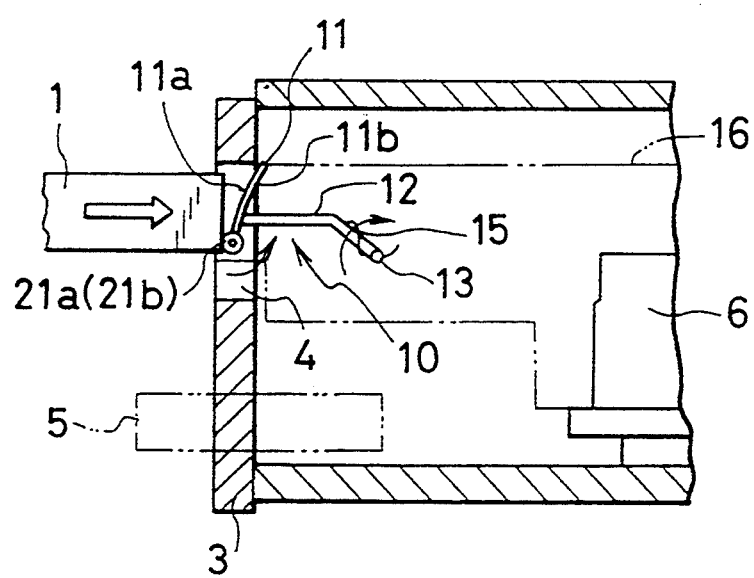
FIG. 6 is an explanatory view showing an optical disk drive unit in accordance with a second embodiment of the present invention.
Figure 7:
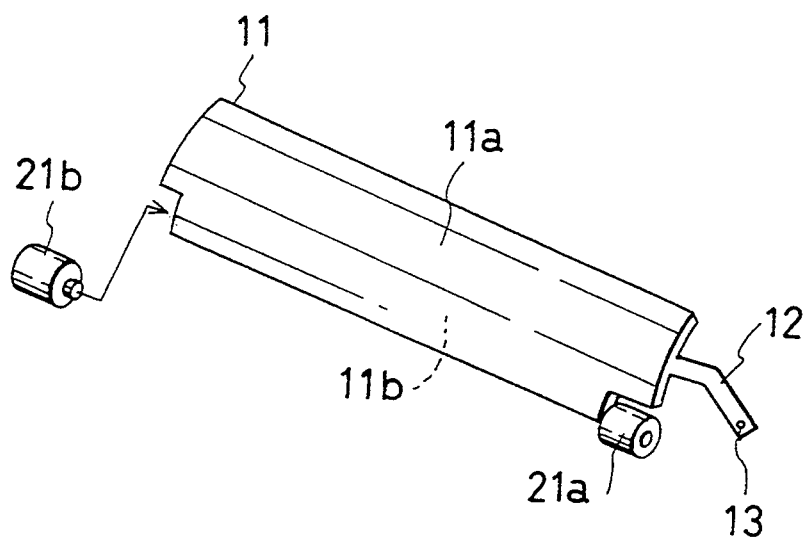
FIG. 7 is a perspective view of a shutter disposed in the optical disk drive unit in the second embodiment of the present invention.

FIG. 6 is a view showing the construction of a main portion of an optical disk drive unit in accordance with a second embodiment of the present invention. FIG. 7 is a perspective view of a shutter disposed in the optical disk drive unit in the second embodiment of the present invention.

The construction of the optical disk drive unit in the second embodiment is different from that in the first embodiment with respect to a pair of rollers 21a and 21b. The rollers 21a and 21b are rotatably disposed in a lower portion of a shutter body 11 and come in contact with the optical disk cartridge 1. The rollers 21a and 21b reduce frictional resistance caused in a contact portion of the optical disk cartridge 1 coming in contact with the shutter 10 when the optical disk cartridge 1 is inserted into a body case 3. Accordingly, the shutter 10 is smoothly opened and closed by the rollers 21a and 21b.

In the above second embodiment, the biasing spring 15 is arranged such that the biasing spring 15 biases the shutter 10 in a direction in which the opening portion 4 is closed. However, the biasing spring 15 may bias the shutter 10 in a direction in which the opening portion 4 is opened if force for closing the opening portion 4 by the shutter 10 is provided by using a loading means, etc. Further, it is possible to use a biasing spring or a toggle spring for biasing the shutter 10 in opening and closing directions thereof in a state in which an arbitrary position of the shutter 10 in opening and closing regions thereof is set to a neutral position.

Figure 8:
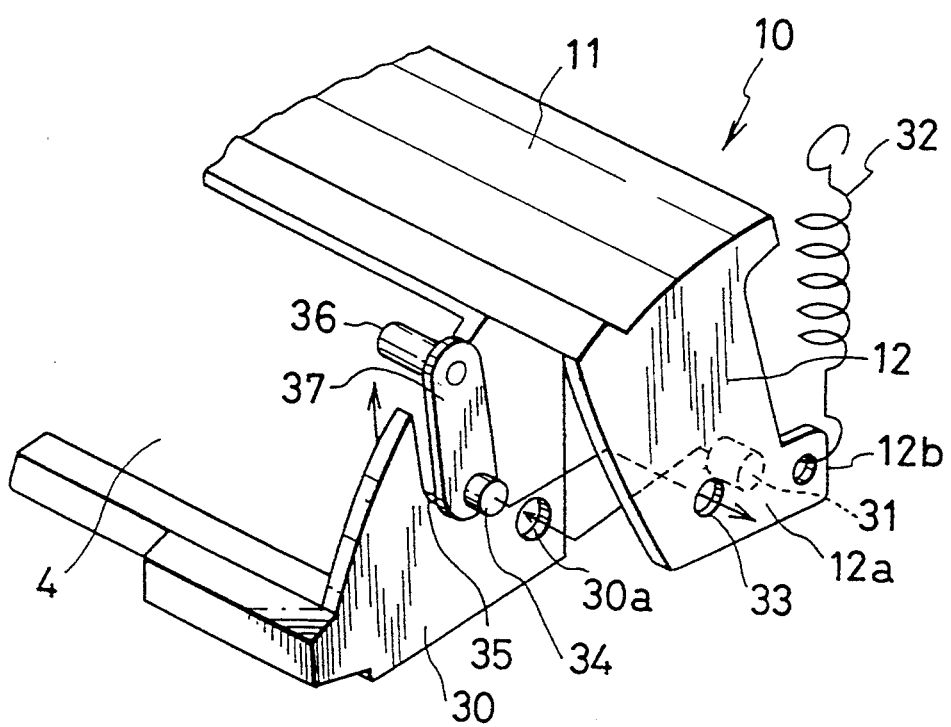
FIG. 8 is a perspective view of a main portion of an optical disk drive unit in accordance with a third embodiment of the present invention.
Figure 9:
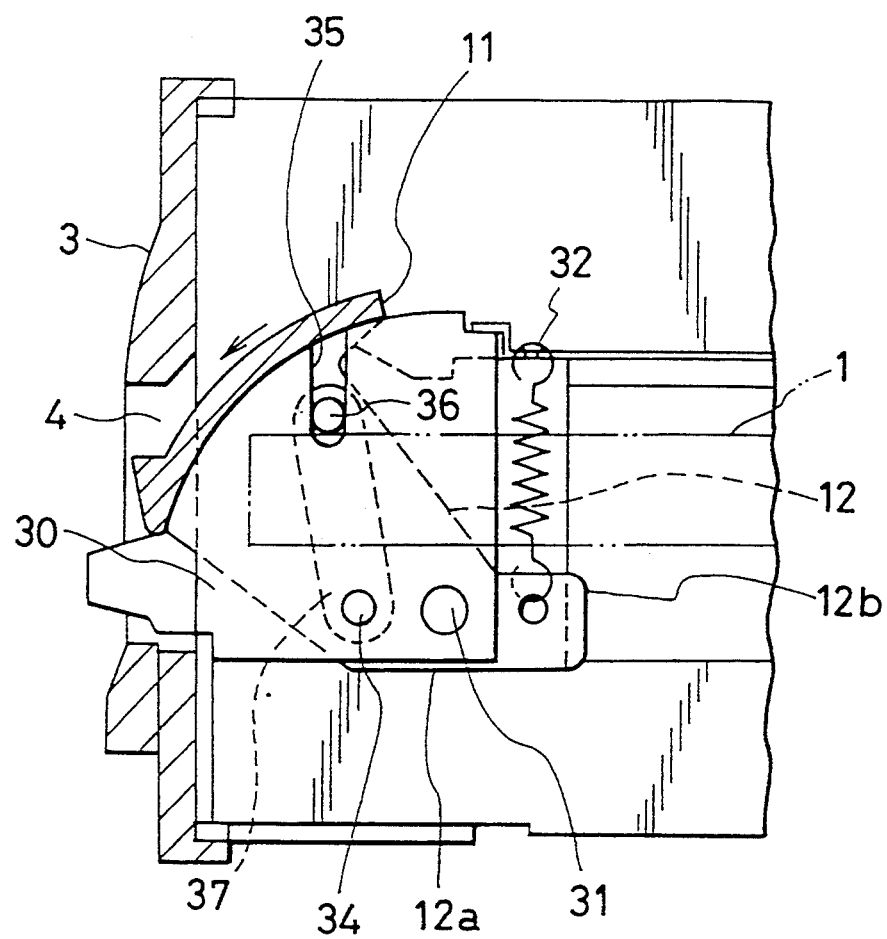
FIG. 9 is a cross-sectional view of the optical disk drive unit in the third embodiment of the present invention shown in FIG. 8.

FIG. 8 is a perspective view of a main portion of an optical disk drive unit in accordance with a third embodiment of the present invention. FIG. 9 is a cross-sectional view of the optical disk drive unit in the third embodiment shown in FIG. 8. In this third embodiment, when an optical disk cartridge 1 is ejected from a body case 3, no optical disk cartridge 1 comes in contact with a shutter 10 to improve durability of the optical disk drive unit.

In FIGS. 8 and 9, a leg portion 12 extends from a shutter body 11 having an arc shape seen from a side of the optical disk drive unit and is approximately formed in the shape of an L seen from the side of the optical disk drive unit. A support shaft 31 is fixed to a bent portion 12a of the leg portion 12 and is rotatably inserted into a receiving hole 30a of a chassis portion 30 disposed in the body case 3. The support shaft 31 is set at the center 13 of rotation in the first embodiment of the present invention. A projecting portion 12b extends from the bent portion 12a. A coil spring 32 is attached to the projecting portion 12b to bias the shutter body 11 in a direction in which the opening portion 4 is closed.

A first pin portion 34 and a cam 37 formed in the shape of an elongated plate are arranged between the leg portion 12 and the chassis portion 30. The first pin portion 34 is inserted into a hole 33 formed in the leg portion 12 in a transversal direction of the support shaft 31. A second pin portion 36 is fixed to the cam 37 and is inserted into a receiving groove 35 disposed in an upper portion of the chassis portion 30. The second pin portion 36 is longer than the first pin portion 34.

Figure 10A:
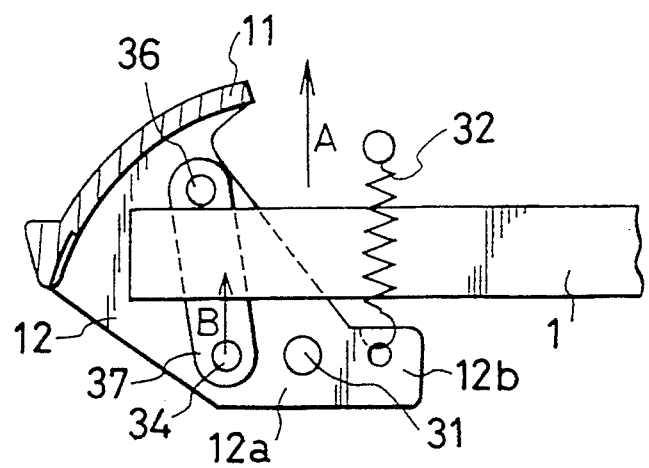
FIGS. 10a to 10c are explanatory views showing an operation of the optical disk drive unit in the third embodiment of the present invention.
Figure 10B:
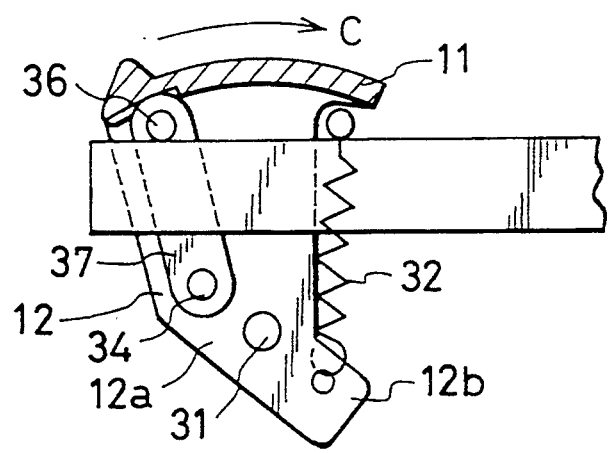
Figure 10C:
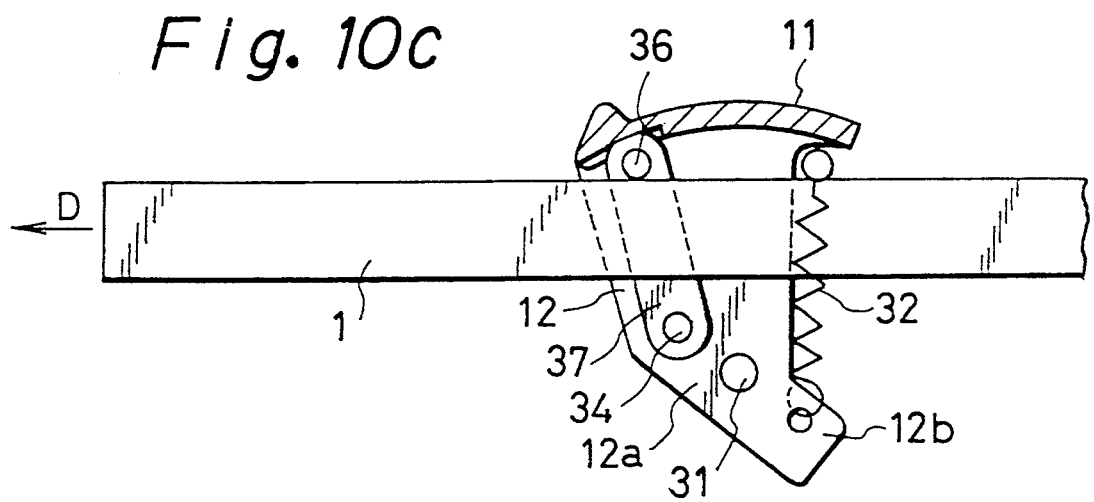

An operation of the optical disk drive unit in the above third embodiment will next be described with reference to FIGS. 10a to 10c showing ejecting states of the optical disk cartridge 1. In FIG. 10a, when an unillustrated ejecting button is pushed, the optical disk cartridge 1 is raised in the direction of an arrow A. Thus, an upper portion of the optical disk cartridge 1 comes in contact with the second pin portion 36 of the cam 37. Force for moving the optical disk cartridge 1 upward is applied to the second pin portion 35 so that the second pin portion 35 is moved upward within the receiving groove 35, thereby raising the cam 37 and the first pin portion 34 in the direction of an arrow B.

As shown in FIG. 10b, since the cam 37 is raised, the shutter body 11 is rotated around the support shaft 31 in the clockwise direction (in the direction of an arrow C), thereby opening the opening portion 4. In this state, as shown in FIG. 10c, the optical disk cartridge 1 is externally ejected from the body case 3 in the direction of an arrow D.

No optical disk cartridge 1 comes in contact with the shutter body 11 during the above ejecting operation. When the optical disk cartridge 1 is taken out of the body case 3, no force for raising the second pin 36 is applied to this second pin 36. Accordingly, biasing force of the coil spring 32 is applied to the shutter body 11 so that the shutter body 11 is rotated in the counterclockwise direction, thereby closing the opening portion 4.

When the shutter body 11 is closed, the optical disk cartridge 1 is inserted into the body case 3 as in the above first embodiment of the present invention. Therefore, this inserting operation of the optical disk cartridge 1 is not described in the following description.

Figure 11:
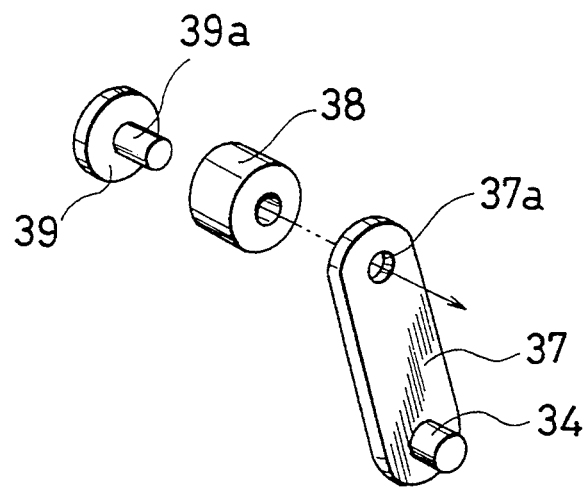
FIG. 11 is a perspective view showing a modified example of the optical disk drive unit in the third embodiment of the present invention.

FIG. 11 shows a modified example of an optical disk drive unit in accordance with a third embodiment of the present invention. In this modified example, an attaching hole 37a is formed in an upper portion of a cam 37. A roller 38 is attached to this cam 37 through a stopper 39 having a shaft body 39a fixed to the attaching hole 37a. At the discharging time of an optical disk cartridge 1, the roller 38 is moved in an upper portion of the optical disk cartridge 1 by making this roller 38 come in contact with the optical disk cartridge 1 while the roller 38 is rotated. Accordingly, a discharging load is reduced and the optical disk cartridge 1 is smoothly moved so that operability and durability of the optical disk drive unit are improved.

Figure 12:
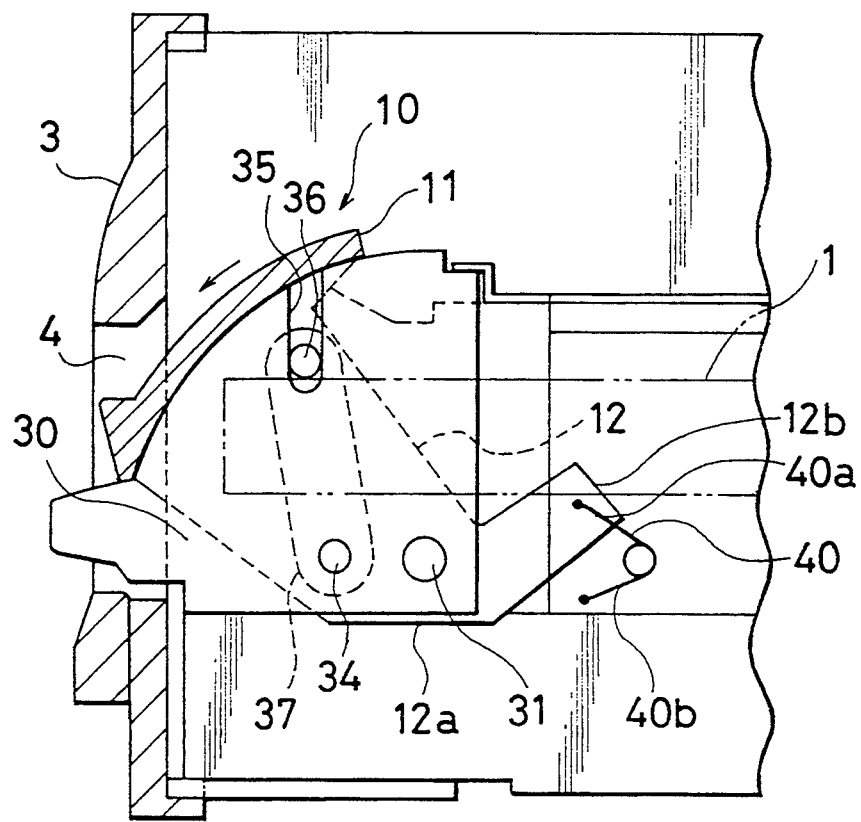
FIG. 12 is a cross-sectional view of an optical disk drive unit in accordance with a fourth embodiment of the present invention.

FIG. 12 is a cross-sectional view of a main portion of an optical disk drive unit in accordance with a fourth embodiment of the present invention. In FIG. 12, constructional members corresponding to those explained in the third embodiment shown in FIGS. 8 and 9 are designated by the same reference numerals and a detailed explanation of these members is omitted in the following description.

Figure 13A:
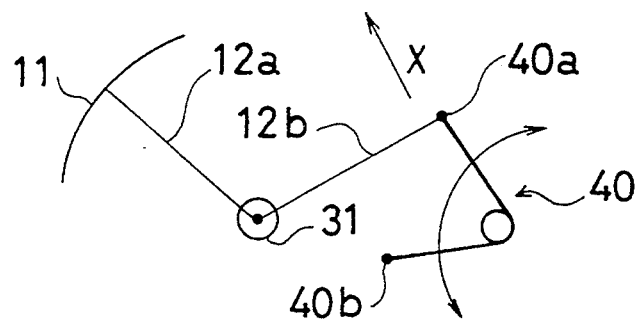
FIGS. 13a to 13c are views for explaining an operation of the optical disk drive unit in the fourth embodiment of the present invention.
Figure 13B:
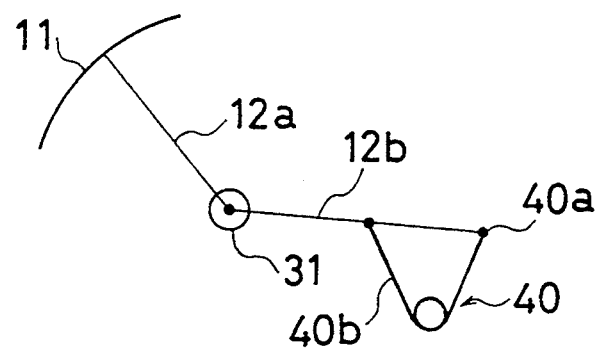
Figure 13C:
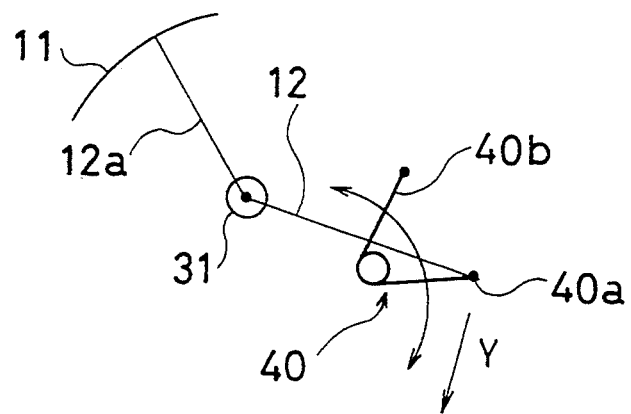

A biasing spring 40 has a bent shape and one end 40a of this biasing spring 40 is fixed to a projecting portion 12b of a leg portion 12 in a shutter body 11. The other end 40b of the biasing spring 40 is fixed to a suitable member disposed within a chassis portion 30. Thus, as shown in FIGS. 13a to 13c for explaining an operation of the optical disk drive unit, the shutter body 11 is biased and rotated in an opening direction irrespective of the operation of a second pin 36 while the shutter body 11 is opened by the above cam 37. Thus, at a discharging time of the optical disk cartridge 1, no second pin 36 of the cam 37 comes in contact with the optical disk cartridge 1, thereby reducing a discharging load.

Namely, the biasing spring 40 gives biasing force in a direction in which both ends of this biasing spring 40 are opened at any time. The biasing spring 40 gives the biasing force to the projecting portion 12b in a closing direction X in a closing state of the shutter body 11 shown in FIG. 13a. At the discharging time of the optical disk cartridge 1, the shutter body 11 is opened until an intermediate position thereof as shown in FIG. 13b by the above opening operation of the shutter body 11 using the cam 37. Further, the biasing spring 40 passes through a position in which the center of a support shaft 31 of the shutter body 11 and both ends 40a and 40b of the biasing spring 40 are aligned and located on one straight line. Thereafter, as shown in FIG. 13c, the biasing spring 40 biases the projecting portion 12b in a Y-direction as an opening direction.

The shutter body 11 is moved in the opening direction by receiving this biasing force. In a state in which the shutter body 11 is completely opened, the optical disk cartridge 1 is separated from the second pin 36 of the cam 37.

Figure 14:
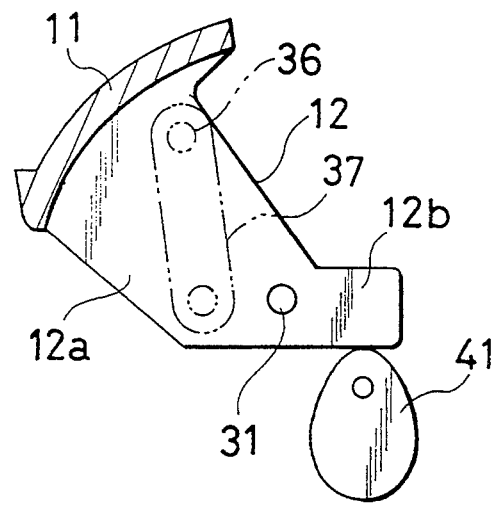
FIG. 14 is an explanatory view showing another example of a shutter operation.

As shown in FIG. 14, an eccentric rotating cam 41 may come in contact with the projecting portion 12b of the shutter body 11. In this case, similar to the above action of the biasing spring 40, the shutter body 11 is rotated in an opening direction thereof while the shutter body 11 is opened by the cam 37. When the optical disk cartridge 1 is moved at a discharging time thereof, no optical disk cartridge 1 comes in contact with the above second pin 36.

In the above embodiment, a front end portion of the optical disk cartridge 1 is inserted into an opening portion 4 of a body case 3 while a rear end portion of the optical disk cartridge 1 is pushed by a manual operation. When the rear end portion of the optical disk cartridge 1 is inserted into the opening portion 4, there is a case in which a portion of operator's fingers comes in contact with the chassis portion 30 around the opening portion 4. In this case, it is not easy to insert the rear end portion of the optical disk cartridge 1 into the opening portion 4.

Figure 15:
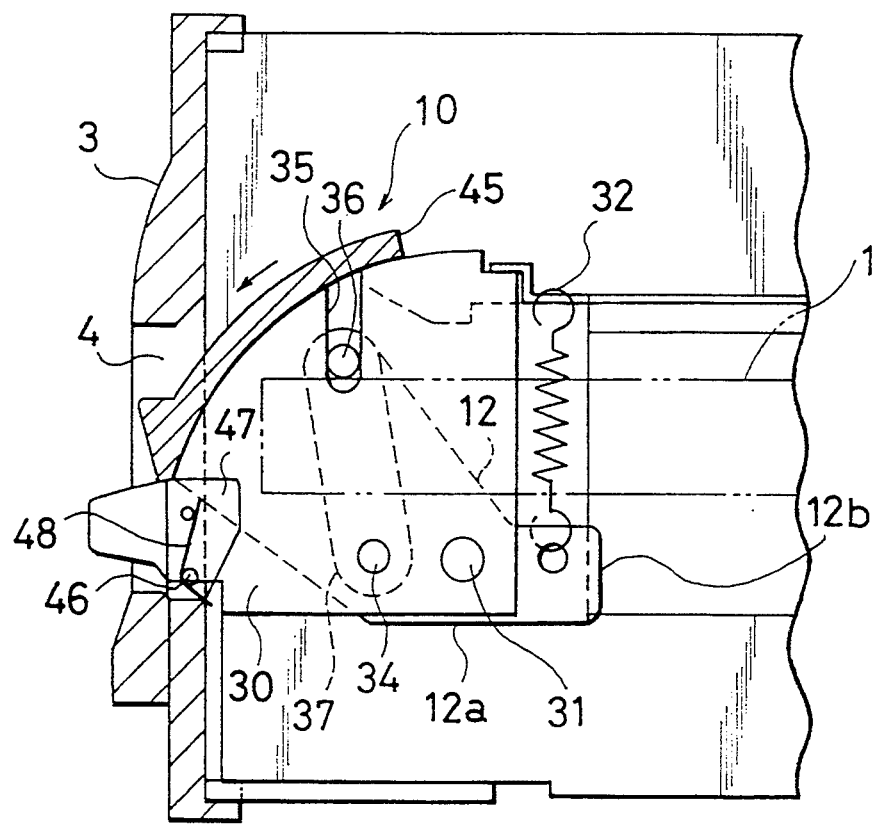
FIG. 15 is a cross-sectional view of an optical disk drive unit in accordance with a fifth embodiment of the present invention.

FIG. 15 is a cross-sectional view of a main portion of an optical disk drive unit in accordance with a fifth embodiment of the present invention. In this fifth embodiment, it is possible to solve this problem about the insertion of the rear end portion of the optical disk cartridge 1. In FIG. 15, a shutter 10 is constructed by a first door 45 having a support shaft 31 as a center of rotation and a second door 47 having a radius of rotation smaller than that of the first door 45. An operation of the first door 45 is similar to that of the shutter body 11 in the third embodiment. An upper side portion of the second door 47 comes in contact with the first door 45. The second door 47 is arranged such that a support shaft 46 of the second door 47 as a center of rotation is located near an opening portion 4 of a case body 3 in comparison with the above support shaft 31. A biasing spring 48 biases the second door 47 in the counterclockwise direction.

Figure 16A:
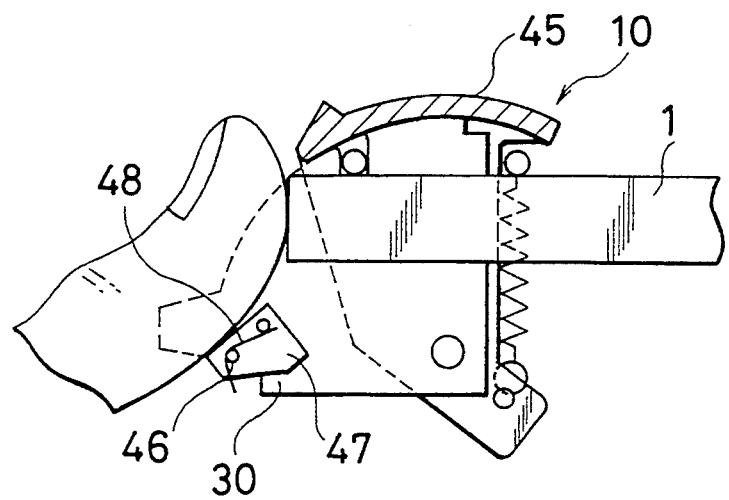
FIGS. 16a and 16b are views for explaining an operation of the optical disk drive unit in the fifth embodiment of the present invention.
Figure 16B:
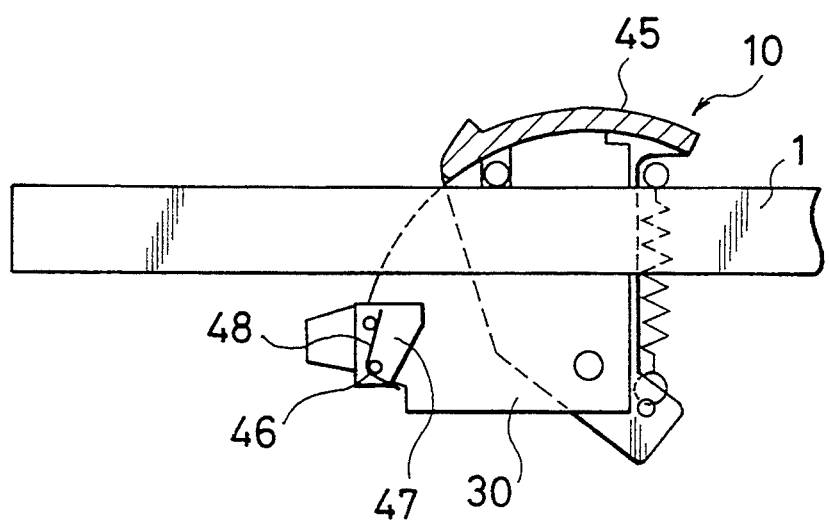

FIGS. 16a and 16b are views for explaining an operation of the optical disk drive unit in the fifth embodiment of the present invention. FIG. 16a shows an operating state of the optical disk drive unit at the inserting time of an optical disk cartridge 1. The second door 47 is rotated in the clockwise direction against biasing force of the biasing spring 48 when a rear end portion of the optical disk cartridge 1 is pushed into a chassis portion 30. Accordingly, no manual pushing operation of the optical disk cartridge 1 is prevented by the second door 47.

FIG. 16b shows an operating state of the optical disk drive unit at a discharging state of the optical disk cartridge 1. The second door 47 is held in a fixed state by the biasing spring 48 so that no discharging operation of the optical disk cartridge 1 is prevented by the second door 47.

Figure 17:
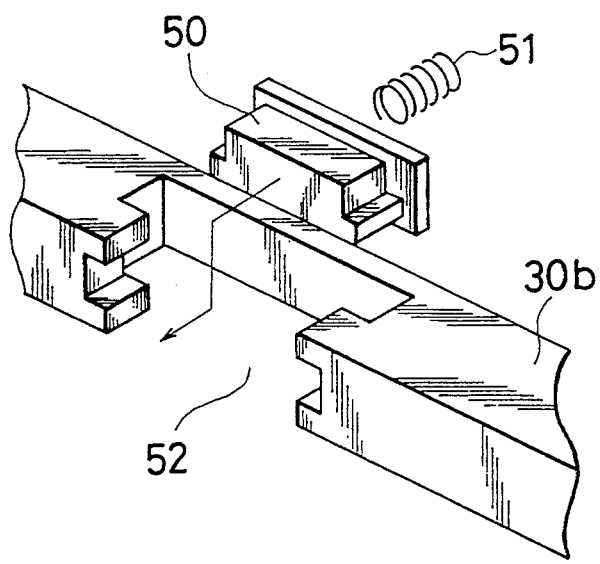
FIG. 17 is an exploded perspective view of a main portion of an optical disk drive unit in accordance with a sixth embodiment of the present invention.
Figure 18:
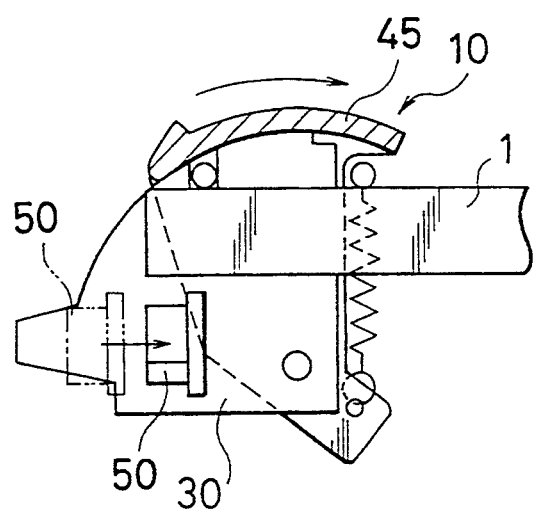
FIG. 18 is a view for explaining an operation of the optical disk drive unit in the sixth embodiment of the present invention.

FIG. 17 is an exploded perspective view of a main portion of an optical disk drive unit in accordance with a sixth embodiment of the present invention. In this sixth embodiment, a door body 50 as a second door is different from that shown in the fifth embodiment. Namely, the door body 50 is disposed in a notch 52 formed in a front frame portion 30b of a chassis portion 30 such that the door body 50 is not rotated but is linearly moved by receiving the resilient force of a coil spring 51 as a biasing spring. As shown in FIG. 18, the door body 50 is manually pushed inside the chassis portion 30 against the resilient force of the coil spring 51 at the inserting time of an optical disk cartridge 1. Accordingly, no manual pushing operation of the optical disk cartridge 1 is prevented by the door body 50.

Figure 19:
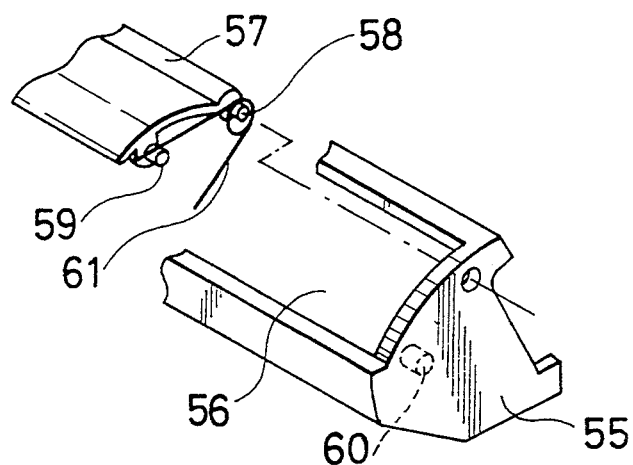
FIG. 19 is a perspective view of a main portion of an optical disk drive unit in accordance with a seventh embodiment of the present invention.
Figure 20:
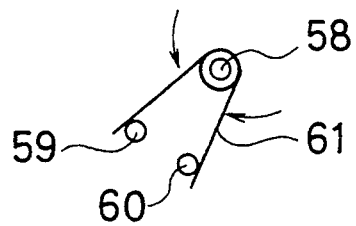
FIG. 20 is a view for explaining a torsional spring shown in FIG. 19.

FIG. 19 is a perspective view of a main portion of an optical disk drive unit in accordance with a seventh embodiment of the present invention. The operation of a first door 55 is similar to the operation of the shutter body 11 in the third embodiment. A rectangular opening 56 is formed in the first door 55. An upper pin 58 of a second door 57 is rotatably supported by the first door 55 having the opening 56. As shown in FIG. 20, one end of a torsional spring 61 resiliently comes in contact with a lower pin 59 of the second door 57. The other end of the torsional spring 61 resiliently comes in contact with an engaging pin 60 disposed on an inner wall of the first door 55. A winding portion of the torsional spring 61 is inserted onto the above upper pin 58. The torsional spring 61 has biasing force in a direction in which the upper pin 59 approaches the engaging pin 60. The torsional spring 61 holds a state in which the opening 56 is closed by the second door 57.

Figure 21A:
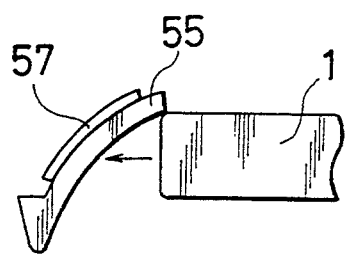
FIGS. 21a and 21b are views for explaining an operation of the optical disk drive unit in the seventh embodiment of the present invention.
Figure 21B:
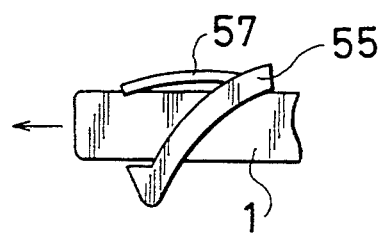

Accordingly, at the inserting time of an optical disk cartridge 1, the first door 55 and the second door 57 are integrally rotated together in an opening direction. At a discharging time of the optical disk cartridge 1, only the second door 57 is rotated and opened outwards since the second door 57 is pushed by an end portion of the optical disk cartridge 1 as shown in FIGS. 21a and 21b. After the optical disk cartridge 1 is taken out of the optical disk drive unit, the second door 57 again closes the opening 56 of the first door 55. As mentioned above, it is sufficient to rotate only the compact second door 57 at the discharging time of the optical disk cartridge 1, thereby reducing a discharging load.

The optical disk drive unit is used in various arrangements. For example, the optical disk drive unit is arranged transversally, longitudinally or slantingly. Therefore, a discharging amount of the optical disk cartridge 1 from the body case 3 is not necessarily constant. For example, there is a fear that the optical disk cartridge 1 is excessively pushed and moved outwards so that the optical disk cartridge 1 is damaged.

Figure 22:
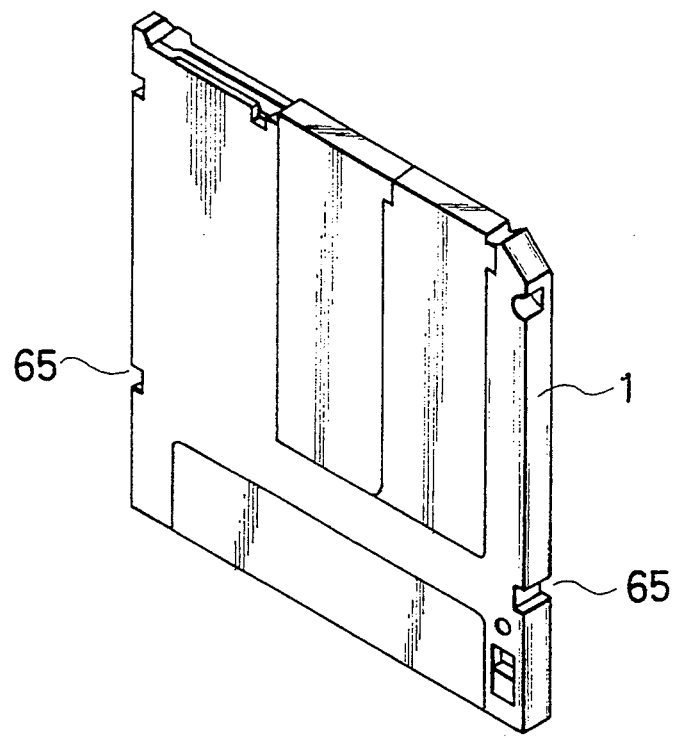
FIG. 22 is a perspective view of an optical disk cartridge.

In an eighth embodiment of the present invention, a notch portion 65 for an automatic change is disposed in a general optical disk cartridge 1 as shown in FIG. 22. The second pin 36 of the cam 37 for moving the shutter body 11 in the third embodiment shown in FIGS. 8 and 9 is used as an engaging portion and is detachably engaged with the above notch portion 65.

Figure 23:
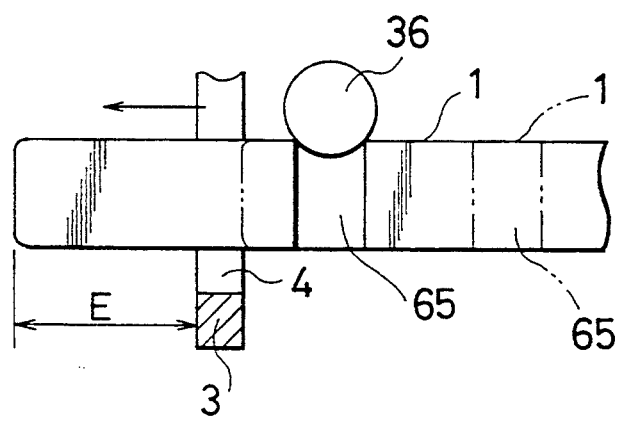
FIG. 23 is an explanatory view of a main portion of an optical disk drive unit in accordance with an eighth embodiment of the present invention.

Accordingly, as shown in FIG. 23, a dropping amount of the optical disk cartridge 1 is set such that the second pin 36 is stopped in a recessed position of the notch portion 65 at a discharging time of the optical disk cartridge 1. Thus, it is possible to constantly set a discharging amount E of the optical disk cartridge 1 from an opening portion 4. When the optical disk cartridge 1 is pulled out of the optical disk drive unit in this state, the second pin 36 gets over the notch portion 65 and the optical disk cartridge 1 can be taken out of the optical disk drive unit.

Figure 24:
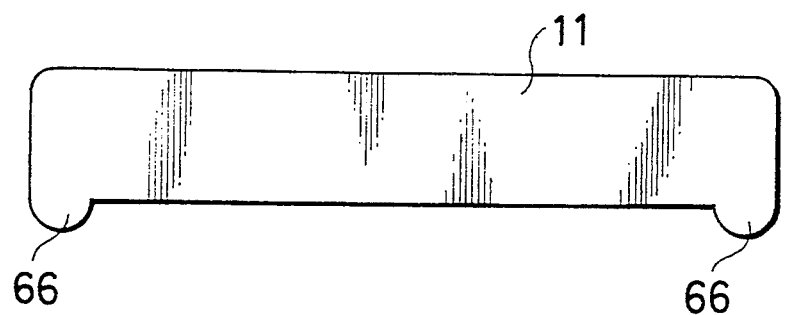
FIG. 24 is a front view showing another example of an engaging portion disposed in the optical disk drive unit in the eighth embodiment of the present invention.
Figure 25:
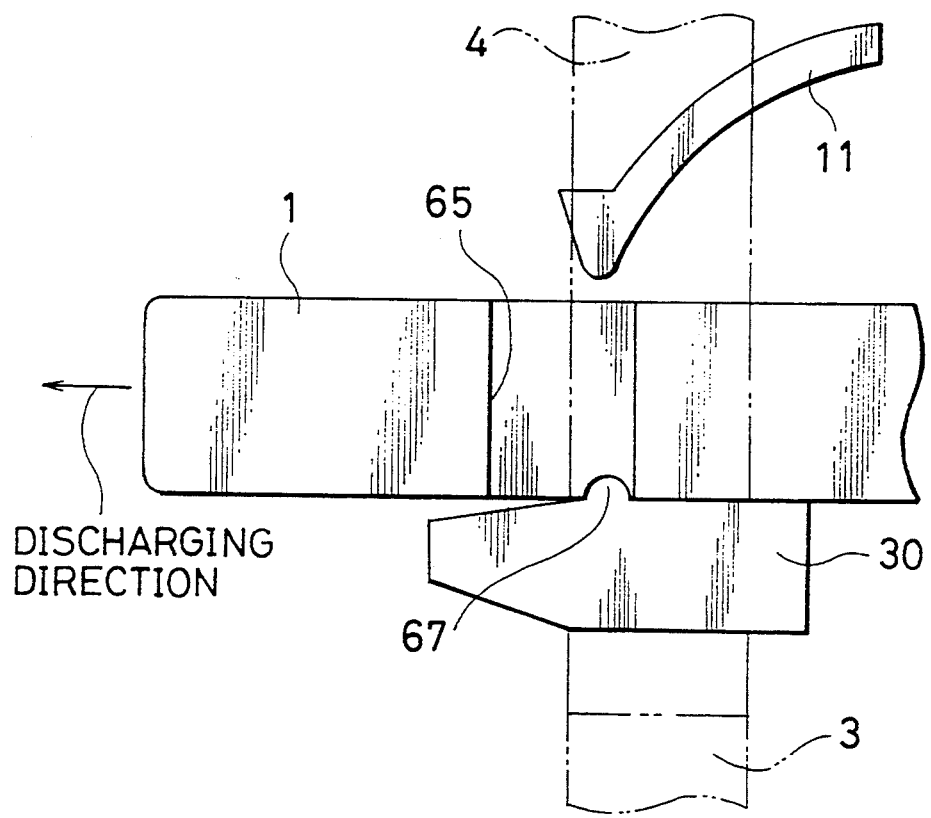
FIG. 25 is an explanatory view showing another example of the engaging portion disposed in the optical disk drive unit in the eighth embodiment of the present invention.

As shown in FIG. 24 as a front view of the shutter body, a projecting portion 66 may be disposed as the above engaging portion in an end portion of the shutter body 11. Further, as shown in FIG. 25, a projection 67 as the above engaging portion may be disposed in the vicinity of the opening portion 4 of the chassis portion 30 shown in FIG. 8.

Figure 26A:
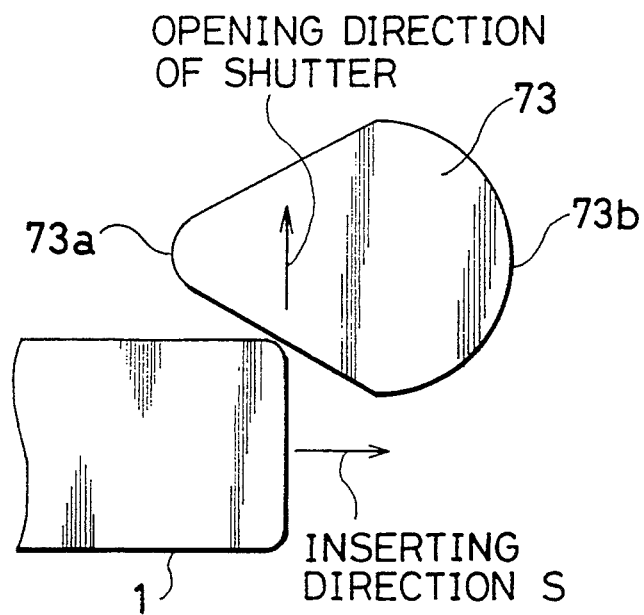
FIGS. 26a and 26b are explanatory views showing a modified example of a second pin constituting the engaging portion.
Figure 26B:
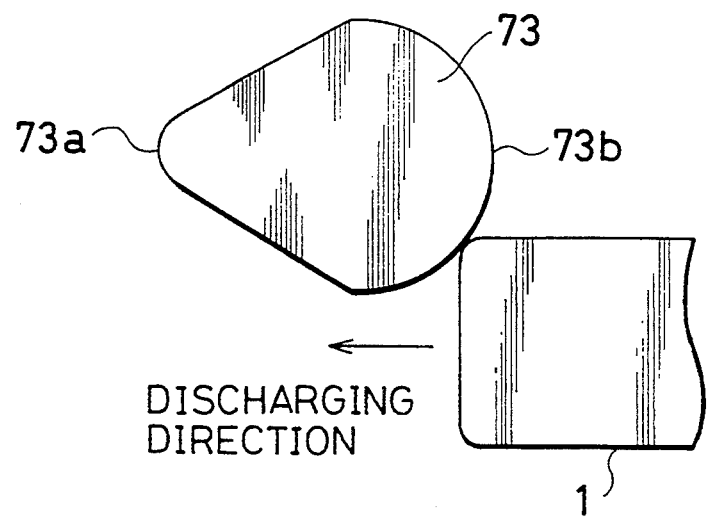

The above second pin 36 may be constructed by a pin 73 having a face shape shown in FIGS. 26a and 26b. Namely, an angle formed between an inserting direction S of the optical disk cartridge 1 and a pin face 73a on an inserting side thereof is set to be smaller than an angle formed between the inserting direction S of the optical disk cartridge 1 and a pin face 73b opposite to the pin face 73a. In this case, the optical disk cartridge 1 is easily inserted at the cartridge inserting time shown in FIG. 26a and is easily stopped at the cartridge discharging time shown in FIG. 26b.

Figure 27:
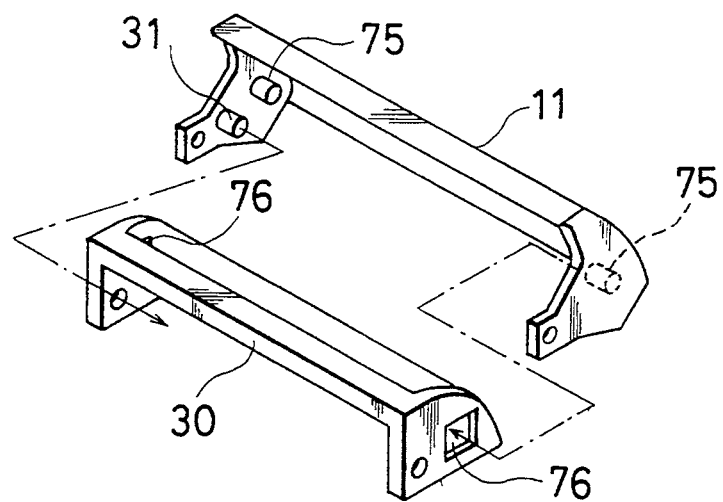
FIG. 27 is a perspective view of a main portion of an optical disk drive unit in accordance with a ninth embodiment of the present invention.

FIG. 27 is a perspective view of a main portion of an optical disk drive unit in accordance with a ninth embodiment of the present invention. In this embodiment, a contact portion 75 is inwardly projected from an inner wall of a shutter body 11 through a through hole 76 disposed in a chassis portion 30. When an optical disk cartridge 1 is mounted to the driving means 6 shown in FIG. 2, the contact portion 75 is pushed down by a lower portion of the optical disk cartridge 1.

Figure 28A:
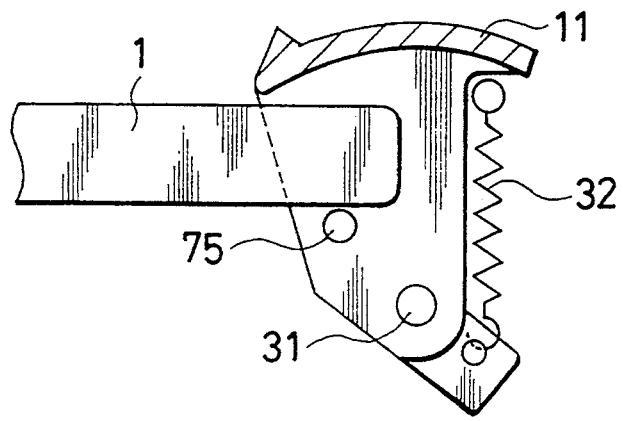
FIGS. 28a and 28b are views for explaining an operation of the optical disk drive unit in the ninth embodiment of the present invention.
Figure 28B:
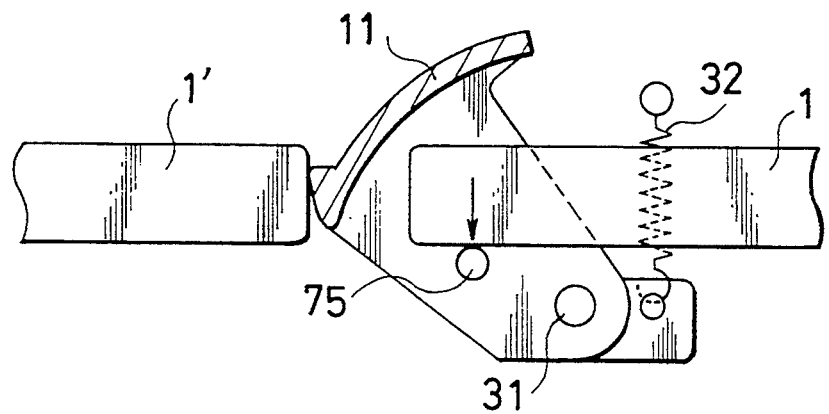

As shown in FIG. 28a, when the optical disk cartridge 1 is inserted, the contact portion 75 is located in a position in which no inserting operation of the optical disk cartridge 1 is influenced by the contact portion 75. When the optical disk cartridge 1 is mounted to the driving means 6 as shown in FIG. 28b, the contact portion 75 comes in contact with the optical disk cartridge 1. Therefore, if another optical disk cartridge 1' is inserted into the optical disk drive unit in an operating state thereof shown in FIG. 28b, no shutter body 11 can be opened since a movement of the contact portion 75 is restricted. Accordingly, it is possible to prevent the optical disk cartridge 1' from being inserted into the optical disk drive unit in error.

The contact portion 75 may be constructed by using the support shaft 31, etc. shown in FIG. 8.

Figure 29:
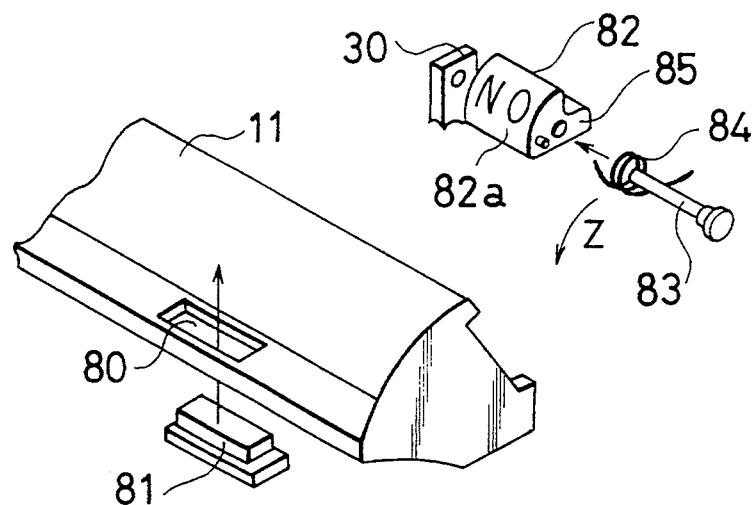
FIG. 29 is an exploded perspective view of a main portion of an optical disk drive unit in accordance with a tenth embodiment of the present invention.

FIG. 29 is an exploded perspective view of a main portion of an optical disk drive unit in accordance with a tenth embodiment of the present invention. In this embodiment, a hole 80 is disposed in a front face portion of a shutter body 11. A transparent member 81 as a display window portion is fixedly disposed in this hole 80 such that the interior of the optical disk drive unit can be seen from the exterior thereof. A display face 82a of a rotatable display body 82 is arranged in a position opposite to the transparent member 81 in which no insertion of an optical disk cartridge 1 is influenced by rotation of the display body 82 at a closing time of the shutter body 11. The display body 82 is supported by a support shaft 83 supported by a chassis portion 30. The display body 82 is biased by a torsional spring 84 such that the display body 82 is rotated in a Z-direction. An operating projection 85 is formed on one side of the display body 82 and comes in contact with the optical disk cartridge 1. The display face 82a may have characters such as "NO" indicating that the optical disk cartridge 1 is already mounted to the internal driving means 6 as shown in FIG. 2. Otherwise, the display face 82a may be colored with a color such as red different from that of a peripheral member.

Figure 30A:
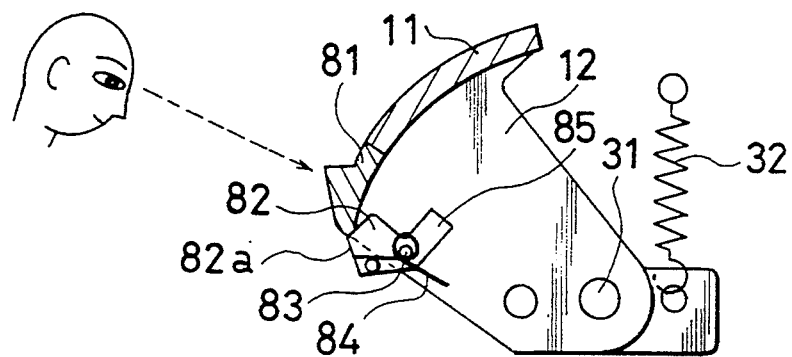
FIGS. 30a and 30b are views for explaining an operation of the optical disk drive unit in the tenth embodiment of the present invention.
Figure 30B:
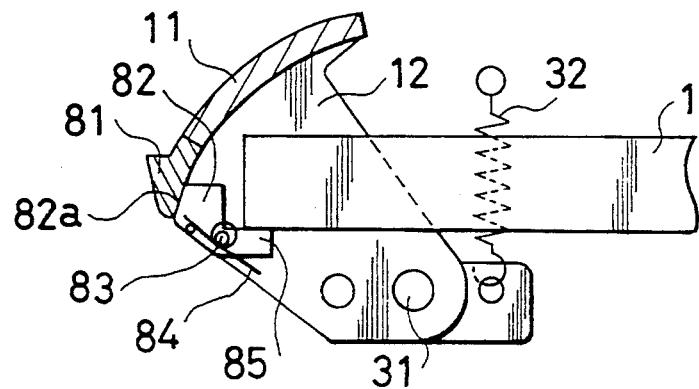

As shown in FIG. 30a, the display body 82 is biased by the torsional spring 84 such that a surface of the display body 82 is directed downward in a state in which no optical disk cartridge 1 is mounted. Accordingly, no user can look at the display face 82a in this state. In contrast to this, as shown in FIG. 30b, the operating projection 85 is pushed down by an end portion of the optical disk cartridge 1 in a state in which the optical disk cartridge 1 is inserted and mounted to the driving means. Thus, the display body 82 is rotated against resilient force of the torsional spring 84 in the clockwise direction around the support shaft 83. Thus, the display face 82a faces the transparent member 81. In this state, the user can look at the display face 82a through the transparent member 81 and can know that the optical disk cartridge 1 is already mounted to the driving means. Accordingly, a mounting operation of the optical disk cartridge 1 is displayed without using any light emitting diode (LED), etc. Thus, there is no fear that another optical disk cartridge is inserted into the optical disk drive unit.

When the entire shutter body 11 is constructed by a transparent member, it is possible to know a mounting state of the optical disk cartridge 1 from the exterior of the optical disk drive unit even when the display body 82 and a member relating to the display body 82 are not disposed.

Figure 31A:
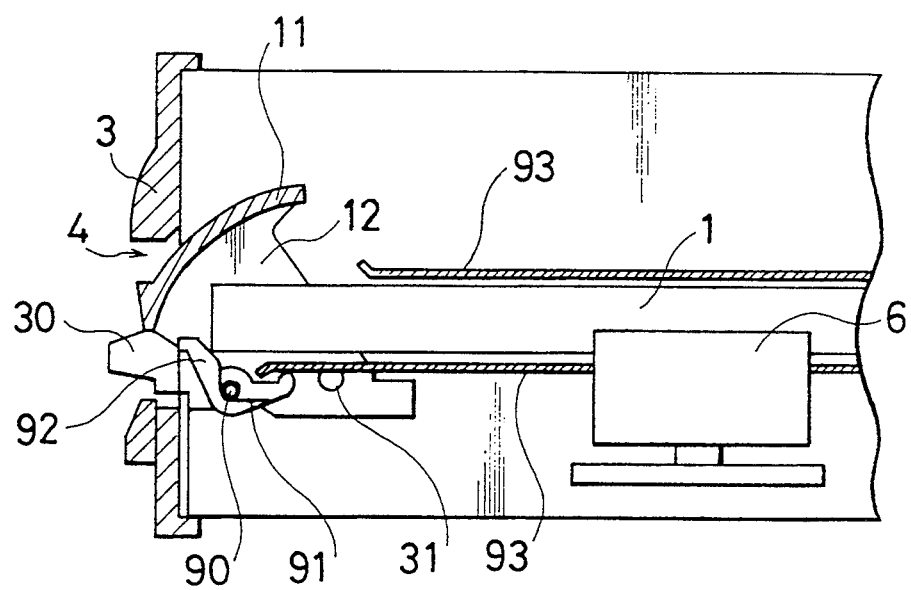
FIGS. 31a and 31b are cross-sectional views of an optical disk drive unit in accordance with an eleventh embodiment of the present invention.
Figure 31B:
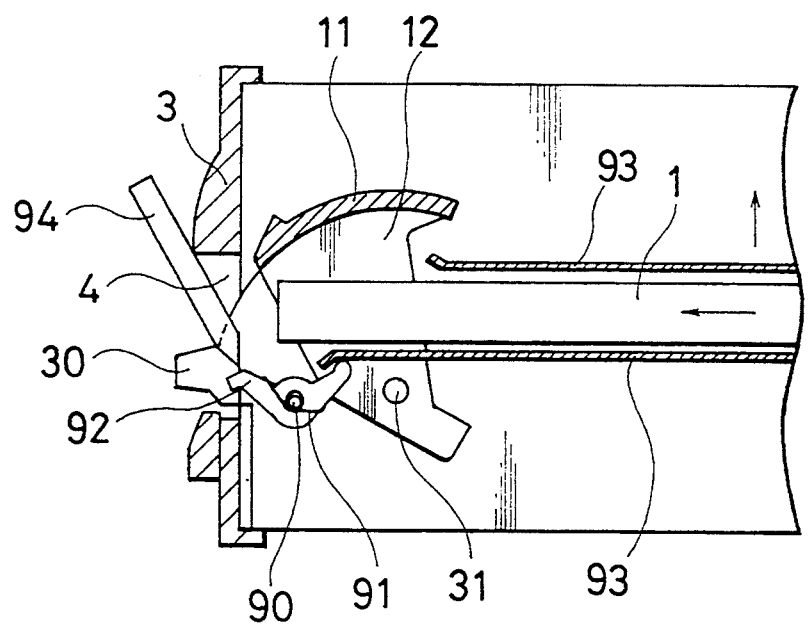

FIGS. 31a and 31b are cross-sectional views of an optical disk drive unit in accordance with an eleventh embodiment of the present invention. In this embodiment, an operating lever body 92 is rotatably supported by a shaft 90 in a chassis portion 30 located below a shutter body 11 for opening and closing an opening portion 4 of a case body 3. The operating lever body 92 is biased by a torsional spring 91 in the counterclockwise direction. A left-hand end portion of this operating lever body 92 is located in a portion of the above opening portion 4. A right-hand end portion of the operating lever body 92 comes in contact with the lower side of a carrier 93 disposed in a loading mechanism of a well-known optical disk cartridge 1.

When no motor as the driving means 6 can be driven by stoppage of electric power, etc. in an operating state of the optical disk drive unit shown in FIG. 31a, the shutter body 11 is opened and the left-hand end portion of the operating lever body 92 is pushed by a jig 94 having a sharp end as shown in FIG. 31b. Thus, the operating lever body 92 is rotated in the counterclockwise direction and the right-hand end portion of the operating lever body 92 pushes the lower side of the carrier 93 of the loading mechanism upwards so that the carrier 93 is moved upwards. Accordingly, it is possible to discharge the optical disk cartridge 1 from the optical disk drive unit by a latch portion and a lever disposed in the unillustrated loading mechanism.

Figure 32:
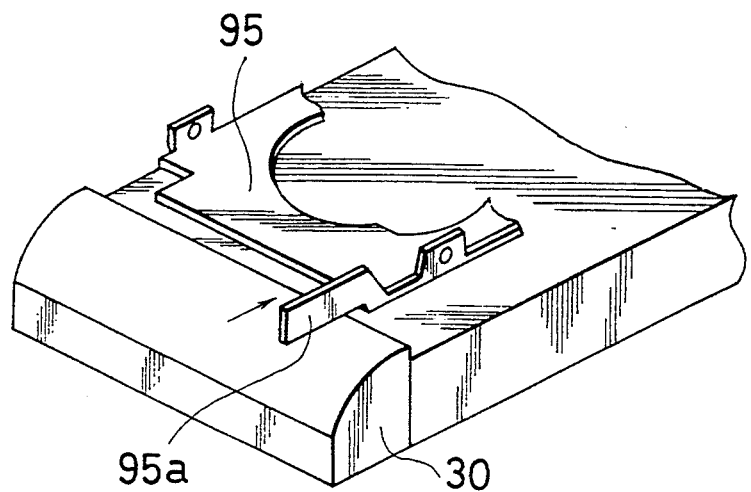
FIG. 32 is a perspective view showing a modified example of the optical disk drive unit in the eleventh embodiment of the present invention.

FIG. 32 is a perspective view showing a modified example of the optical disk drive unit in the eleventh embodiment of the present invention. In this example, no operating lever body 92 is disposed and a portion 95a of a carrier 95 in a loading mechanism is extended until a position near the opening portion 4 of the case body 3. As mentioned above, the shutter body 11 is opened when no driving means 6 can be driven. The portion 95a of the carrier 95 is then pushed inwards so that the optical disk cartridge 1 can be discharged from the optical disk drive unit by a discharging operation similar to that described in the above eleventh embodiment.

Figure 33:
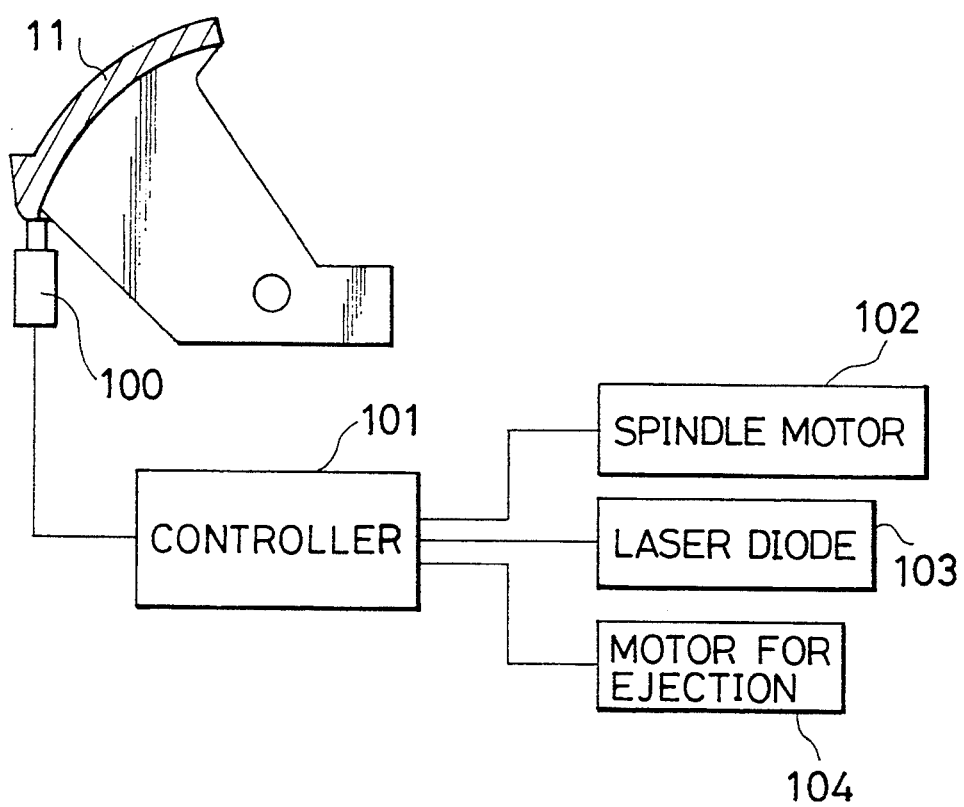
FIG. 33 is a view for explaining an optical disk drive unit in accordance with a twelfth embodiment of the present invention.

FIG. 33 is an explanatory view showing the construction of an optical disk drive unit in accordance with a twelfth embodiment of the present invention. In this embodiment, a switch 100 is engaged with a lower end portion of a shutter body 11. This switch 100 transmits an electric signal indicative of an opening state of the shutter body 11 to a controller 101 when there is no stoppage of electric power. The controller 101 receiving this electric signal transmits a control signal to a spindle motor 102 as a driving means, a laser diode 103 and a motor 104 for ejection.

Figure 34:
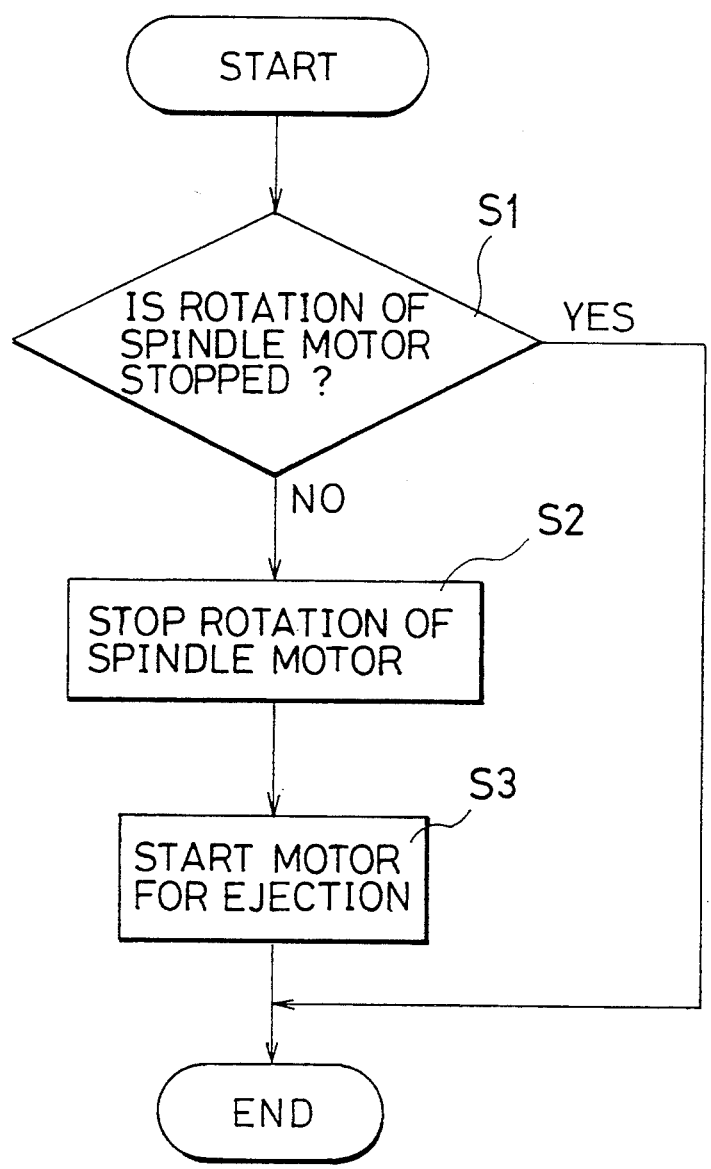
FIG. 34 is a flow chart of a control operation of the optical disk drive unit in the twelfth embodiment of the present invention.

When an optical disk cartridge 1 is discharged from the optical disk drive unit in emergency, the switch 100 is turned on by opening the shutter body 11. As shown by the flow chart in FIG. 34, a rotation of the spindle motor 102 in a step S1 is stopped by an operation of the controller 101 since a judgment in a step S2 is NO. Simultaneously, the laser diode 103 is turned off. Further, the motor 104 for ejection is started in a step S3 to discharge the optical disk cartridge 1 from the optical disk drive unit.

As mentioned above, in accordance with a first structure of the present invention, a center of rotation of the shutter is located on the side of a driving means away from the opening portion within the body case. Accordingly, it is possible to open and close the shutter without any problem in an operation for mounting the optical disk cartridge into the body case. Therefore, the opening portion is reliably closed by the shutter.

In accordance with a second structure of the present invention, a space for arranging the shutter can be reduced.

In accordance with third and fourth structures of the present invention, the shutter is smoothly moved by the optical disk cartridge.

In accordance with a fifth structure of the present invention, when the optical disk cartridge is ejected from the body case by using a cam, no optical disk cartridge comes in contact with the shutter so that it is possible to improve durability of the optical disk drive unit.

In accordance with a sixth structure of the present invention, contact resistance is reduced in a contact portion of the cam coming in contact with the optical disk cartridge. Accordingly, no optical disk cartridge is damaged and inserting and discharging operations of the optical disk cartridge are preferably performed.

In accordance with seventh and eighth structures of the present invention, no cam comes in contact with the optical disk cartridge when the optical disk cartridge is discharged. Accordingly, a discharging load is reduced at the discharging time of the optical disk cartridge and the discharging operation of the optical disk cartridge is smoothly performed.

In accordance with a ninth structure of the present invention, the second door is rotated in a position in which no manual inserting operation is prevented by rotation of the second door when the optical disk cartridge is inserted. Accordingly, it is possible to prevent dust from entering the optical disk drive unit and the optical disk cartridge is easily inserted into the optical disk drive unit.

In accordance with a tenth structure of the present invention, when the optical disk cartridge is mounted into the body case, the second door is first closed before a closing operation of the first door. Accordingly, it is possible to reliably prevent dust from entering the optical disk drive unit.

In accordance with an eleventh structure of the present invention, a space required to rotate the doors can be minimized.

In accordance with a twelfth structure of the present invention, only the compact second door is opened when the optical disk cartridge is discharged. Accordingly, at the discharging time of the optical disk cartridge, a discharging load is reduced and the discharging operation of the optical disk cartridge is smoothly performed.

In accordance with a thirteenth structure of the present invention, the discharging operation of the optical disk cartridge can be temporarily stopped by the engaging portion when the optical disk cartridge is discharged. Accordingly, a discharging amount of the optical disk cartridge can be constantly stabilized so that it is possible to prevent an accident caused by an excessive discharging amount of the optical disk cartridge.

In accordance with a fourteenth structure of the present invention, no insertion of the optical disk cartridge is prevented by the engaging portion when the optical disk cartridge is inserted. When the optical disk cartridge is discharged, it is possible to reliably stop a discharging movement of the optical disk cartridge once.

In accordance with a fifteenth structure of the present invention, it is easy to control a discharging amount of the optical disk cartridge.

In accordance with a sixteenth structure of the present invention, no shutter can be moved when the optical disk cartridge is mounted to the body case. Accordingly, no second optical disk cartridge can be inserted so that there is no fear that this optical disk cartridge is inserted in error.

In accordance with seventeenth and eighteenth structures of the present invention, a mechanism for preventing the optical disk cartridge from being inserted in error can be provided by a structure cheaply manufactured without using any electric means such as LED.

In accordance with a nineteenth structure of the present invention, the operating body is disposed inside the shutter and constitutes an emergent ejecting mechanism for ejecting the optical disk cartridge in emergency such as stoppage of electric power. Accordingly, it is possible to more reliably prevent dust from entering the optical disk drive unit.

In accordance with twentieth and twenty-first structures of the present invention, safety of the optical disk drive unit is improved when the shutter is opened. For example, when the shutter is opened in error at a supplying time of electric power, an accident can be prevented and warning can be given to a user by the discharging operation of the optical disk cartridge.

Therefore, it is possible to provide an optical disk cartridge which reliably and smoothly closes and opens the shutter by a simplified structure and prevents dust from entering the body case and smoothly and reliably inserts and discharges the optical disk cartridge.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical disk drive unit comprising:

an opening portion formed in a body case to insert an optical disk cartridge having an optical disk therein into the body case and take the optical disk cartridge out of the body case;

driving means for receiving and rotating said optical disk; and a rotatable shutter for opening and closing said opening portion and formed such that a center of rotation of the shutter is located on a side of the driving means within said body case, wherein said shutter is constructed by a first door and a second door.

2. An optical disk drive unit as claimed in claim 1, wherein said second door comes in contact with the first door, and a center of rotation of the first door is arranged on said side of the driving means and a center of rotation of the second door is arranged on a side opposite to a side of the second door coming in contact with the first door.

3. An optical disk drive unit as claimed in claim 2, wherein the center of rotation of said second door is nearer said opening portion of the body case than the center of rotation of the first door.

4. An optical disk drive unit as claimed in claim 2, wherein a radius of rotation of said second door is smaller than that of the first door.

5. An optical disk drive unit as claimed in claim 1, wherein said second door has a center of rotation in the first door and opened in only a discharging direction of the optical disk cartridge.

6. An optical disk drive unit comprising:

an opening portion formed in a body case to insert an optical disk cartridge having an optical disk therein into the body case and take the optical disk cartridge out of the body case;

driving means for receiving and rotating said optical disk; and a rotatable shutter for opening and closing said opening portion and formed such that a center of rotation of the shutter is located on a side of the driving means within said body case;

wherein the optical disk drive unit further comprises a display body indicating a mounting state of the optical disk cartridge and moved to a display window portion in association with a movement of the optical disk cartridge mounted to the driving means.

7. An optical disk drive as claimed in claim 6, wherein said display body has characters showing the mounting state of the optical disk cartridge or has a color different from that of a peripheral member.

8. An optical disk unit comprising:

an opening portion formed in a body case for inserting an optical disk cartridge into said body case and taking said cartridge out of said body case, said cartridge having an optical disk therein;

a shutter supported rotatably in said body case for opening and closing said opening portion;

a driving device, fixed to said body case, for receiving said cartridge inserted through said opening portion and for rotating said optical disk in said cartridge; and a cam, linked with said shutter and including a roller which comes in contact with said cartridge, for opening said shutter in association with an ejection movement of said cartridge when cartridge is ejected, said shutter closing said opening portion except when said cartridge is inserted or ejected, said shutter opening said opening portion by coming into contact with said cartridge when said cartridge is inserted and opening said opening portion in association with said ejection movement.

9. An optical disk drive unit according to claim 8, which further comprises an engaging portion detachably engaged with a notch portion of said cartridge so as to temporarily stop a discharging operation of said cartridge.

10. An optical disk drive unit comprising:

an opening portion formed in a body case for inserting an optical disk cartridge into said body case and taking said cartridge out of said body case, said cartridge having an optical disk therein;

a shutter supported rotatably in said body case for opening and closing said opening portion;

a driving device, fixed to said body case, for receiving said cartridge inserted through said opening portion and for rotating said optical disk in said cartridge;

a cam, linked with said shutter, for opening said shutter in association with an ejection movement of said cartridge when said cartridge is ejected; and a rotating cam for rotating said shutter toward an opening direction of said shutter during an opening operation of said shutter by said cam, said shutter closing said opening portion except when said cartridge is inserted or ejected, said shutter opening said opening portion by coming into contact with said cartridge when said cartridge in inserted and opening said opening portion in association with said ejection movement.

11. An optical disk drive unit according to claim 10, wherein a rotational center of said shutter is located on a side of said driving device within said body case.

12. An optical disk drive unit according to claim 10, wherein at least one face of said shutter is formed by an arc face in a shape approximately equal to the shape of an arc around a rotational center of said shutter.

13. An optical disk drive unit according to claim 10, wherein said shutter has a projecting portion, and a lower part from a tip of said projecting portion comes in contact with said cartridge.

14. An optical disk drive unit according to claim 10, wherein said shutter has at least one roller which comes in contact with said cartridge.

15. An optical disk drive unit comprising:

an opening portion formed in a body case for inserting an optical disk cartridge into said body case and taking said cartridge out of said body case, said cartridge having an optical disk therein;

a shutter supported rotatably in said body case for opening and closing said opening portion;

a driving device, fixed to said body case, for receiving said cartridge inserted through said opening portion and for rotating said optical disk in said cartridge; and an engaging portion detachably engaged with a notch portion of said cartridge so as to temporarily stop a discharging operation of said cartridge, said shutter closing said opening portion except when said cartridge is inserted or ejected, said shutter opening said opening portion by coming into contact with said cartridge when said cartridge is inserted and opening said opening portion in association with an ejection movement of said cartridge when said cartridge is ejected, and an angle between an inserting direction of said cartridge and a face of said engaging portion on an inserting side of said cartridge being smaller than an angle between said inserting direction and a face of said engaging portion on a side opposite to said inserting side of said cartridge.

16. An optical disk drive unit according to claim 15, which further comprises a cam, linked with said shutter, for opening said shutter in association with said ejection movement.

17. An optical disk drive unit comprising:

an opening portion formed in a body case for inserting an optical disk cartridge into said body case and taking said cartridge out of said body case, said cartridge having an optical disk therein;

a shutter supported rotatably in said body case for opening and closing said opening portion;

a driving device, fixed to said body case, for receiving said cartridge inserted through said opening portion and for rotating said optical disk in said cartridge; and an engaging portion, disposed in a vicinity of said opening portion of said body case and detachably engaged with a notch portion of said cartridge so as to temporarily stop a discharging operation of said cartridge, said shutter closing said opening portion except when said cartridge is inserted or ejected, said shutter opening said opening portion by coming into contact with said cartridge when said cartridge is inserted and opening said opening portion in association with an ejection movement of said cartridge when said cartridge is ejected.

18. An optical disk drive unit comprising:

an opening portion formed in a body case for inserting an optical disk cartridge into said body case and taking said cartridge out of said body case, said cartridge having an optical disk therein;

a shutter supported rotatably in said body case for opening and closing said opening portion; and a driving device, fixed to said body case, for receiving said cartridge inserted through said opening portion and for rotating said optical disk in said cartridge, said shutter closing said opening portion except when said cartridge is inserted or ejected, said shutter opening said opening portion by coming into contact with said cartridge when said cartridge is inserted and opening said opening portion in association with an ejection movement of said cartridge when said cartridge is ejected, and said shutter comprising a contacting portion for coming in contact with said optical disk cartridge so as to stop a movement of said shutter when said cartridge is mounted on said driving device.

19. An optical disk drive unit comprising:

an opening portion formed in a body case for inserting an optical disk cartridge into said body case and taking said cartridge out of said body case, said cartridge having an optical disk therein;

a loading mechanism of said cartridge;

a shutter supported rotatably in said body case for opening and closing said opening portion;

a driving device, fixed to said body case, for receiving said cartridge inserted through said opening portion and for rotating said optical disk in said cartridge, and an operating body disposed inside said shutter and engaged with said loading mechanism thereby to move said loading mechanism so that said cartridge is ejected from said body case, said shutter closing said opening portion except when said cartridge is inserted or ejected, said shutter opening said opening portion by coming into contact with said cartridge when said cartridge is inserted and opening said opening portion in association with an ejection movement of said cartridge when said cartridge is ejected.

20. An optical disk drive unit comprising:

an opening portion formed in a body case for inserting an optical disk cartridge into said body case and taking said cartridge out of said body case, said cartridge having an optical disk therein;

a shutter supported rotatably in said body case for opening and closing said opening portion;

a driving device, fixed to said body case, for receiving said cartridge inserted through said opening portion and for rotating said optical disk in said cartridge, and a switch, partially engaged with said shutter, for stopping an operation of said driving device when said shutter is opened, said shutter closing said opening portion except when said cartridge is inserted or ejected, said shutter opening said opening portion by coming into contact with said cartridge when said cartridge is inserted and opening said opening portion in association with an ejection movement of said cartridge when said cartridge is ejected.

21. An optical disk drive unit according to claim 20, wherein an ejecting operation of said cartridge is performed when said shutter is opened.

* * * * *